United States Patent
Huang et al.

(10) Patent No.: US 11,926,689 B2
(45) Date of Patent: Mar. 12, 2024

(54) HYDROPHILIZED POLYDIORGANOSILOXANE VINYLIC CROSSLINKERS AND USES THEREOF

(71) Applicant: Alcon Inc., Fribourg (CH)

(72) Inventors: Jinyu Huang, Ridgewood, NJ (US); Frank Chang, Cumming, GA (US); Steve Yun Zhang, Sugar Hill, GA (US); Feng Jing, Snellville, GA (US)

(73) Assignee: Alcon Inc., Fribourg (CH)

( * ) Notice: Subject to any disclaimer, the term of this patent is extended or adjusted under 35 U.S.C. 154(b) by 55 days.

(21) Appl. No.: 17/870,329

(22) Filed: Jul. 21, 2022

(65) Prior Publication Data
US 2022/0380509 A1   Dec. 1, 2022

Related U.S. Application Data

(60) Continuation of application No. 17/038,349, filed on Sep. 30, 2020, now Pat. No. 11,453,736, which is a continuation of application No. 16/278,304, filed on Feb. 18, 2019, now Pat. No. 10,870,722, which is a continuation of application No. 16/110,194, filed on Aug. 23, 2018, now Pat. No. 10,246,543, which is a division of application No. 15/376,700, filed on Dec. 13, 2016, now Pat. No. 10,081,697.

(60) Provisional application No. 62/267,310, filed on Dec. 15, 2015.

(51) Int. Cl.
| C08L 101/14 | (2006.01) |
| C08F 290/06 | (2006.01) |
| C08G 77/16 | (2006.01) |
| C08G 77/20 | (2006.01) |
| C08G 77/392 | (2006.01) |
| C08L 83/04 | (2006.01) |
| G02B 1/04 | (2006.01) |
| C08G 77/12 | (2006.01) |

(52) U.S. Cl.
CPC .......... *C08F 290/068* (2013.01); *C08G 77/16* (2013.01); *C08G 77/20* (2013.01); *C08G 77/392* (2013.01); *G02B 1/043* (2013.01); *C08G 77/12* (2013.01)

(58) Field of Classification Search
CPC ........ G02B 1/043; C08L 83/04; C08L 101/14
See application file for complete search history.

(56) References Cited

U.S. PATENT DOCUMENTS

| 3,700,573 | A | * | 10/1972 | Laizier et al. | C08F 283/12 522/138 |
| 4,260,725 | A | * | 4/1981 | Keogh | C08F 230/08 264/1.1 |
| 5,397,848 | A | * | 3/1995 | Yang | A61L 27/18 523/106 |
| 5,760,100 | A | * | 6/1998 | Nicolson | G02C 7/049 351/159.33 |
| 6,331,578 | B1 | * | 12/2001 | Turner | C08F 283/12 523/105 |
| 8,835,525 | B2 | * | 9/2014 | Kuyu | C08G 77/42 523/107 |
| 9,052,440 | B2 | * | 6/2015 | Kuyu | C08G 77/42 |
| 2003/0162862 | A1 | * | 8/2003 | McCabe | A61L 27/18 523/106 |
| 2003/0188841 | A1 | * | 10/2003 | Buder | A61K 8/0208 162/179 |
| 2007/0066706 | A1 | * | 3/2007 | Manesis | G02B 1/043 523/106 |
| 2009/0234089 | A1 | * | 9/2009 | Ueyama | C08F 8/42 526/279 |
| 2010/0063237 | A1 | * | 3/2010 | Dhruv | C08J 3/20 528/32 |
| 2010/0089540 | A1 | * | 4/2010 | Buder | A61K 8/0208 162/162 |
| 2011/0140292 | A1 | | 6/2011 | Chang et al. | |
| 2012/0088843 | A1 | * | 4/2012 | Chang | G02B 1/043 514/772.3 |
| 2012/0088844 | A1 | * | 4/2012 | Kuyu | C08G 77/42 514/772.3 |
| 2014/0018465 | A1 | * | 1/2014 | Liu | G02B 1/043 523/107 |
| 2014/0350124 | A1 | * | 11/2014 | Kuyu | C08G 77/42 514/772.1 |
| 2017/0166675 | A1 | * | 6/2017 | Chang | C08F 283/124 |

OTHER PUBLICATIONS

Structure Search 17038349—Apr. 25, 2022 (Year: 2022).*

* cited by examiner

*Primary Examiner* — Peter A Salamon
(74) *Attorney, Agent, or Firm* — Jian Zhou

(57) ABSTRACT

The invention provides a hydrophilized polydiorganosiloxane vinylic crosslinker which comprises (1) a polydiorganosiloxane polymer chain comprising dimethylsiloxane units and hydrophilized siloxane units each having one methyl substituent and one monovalent $C_4$-$C_{40}$ organic radical substituent having two to six hydroxyl groups, wherein the molar ratio of the hydrophilized siloxane units to the dimethylsiloxane units is from about 0.035 to about 0.15, and (2) two terminal (meth)acryloyl groups. The hydrophilized polydiorganosiloxane vinylic crosslinker has a number average molecular weight of from about 3000 Daltons to about 80,000 Daltons. The present invention is also related to a silicone hydrogel contact lens, which comprises repeating units derived from a hydrophilized polydiorganosiloxane vinylic crosslinker of the invention.

19 Claims, No Drawings ically the lens-forming composition in the lens mold to
HYDROPHILIZED POLYDIORGANOSILOXANE VINYLIC CROSSLINKERS AND USES THEREOF This application is a continuation of U.S. patent application Ser. No. 17/038,349 filed 30 Sep. 2020, which is a continuation of U.S. patent application Ser. No. 16/278,304 filed 18 Feb. 2019, now U.S. Pat. No. 10,870,722, which is a continuation of U.S. patent application Ser. No. 16/110,194 filed 23 Aug. 2018, now U.S. Pat. No. 10,246,543, which is a divisional application of U.S. patent application Ser. No. 15/376,700 filed 13 Dec. 2016, now U.S. Pat. No. 10,081,697, which claims the benefit under 35 USC § 119 (e) of U.S. provisional application No. 62/267,310 filed 15 Dec. 2015, herein incorporated by reference in its entirety.

The present invention is related to a hydrophilized polydiorganosiloxane vinylic crosslinker, to silicone hydrogel contact lenses comprising repeating units of such a hydrophilized polydiorganosiloxane vinylic crosslinker, as well as a method for producing silicone hydrogel contact lenses from such a hydrophilized polydiorganosiloxane vinylic crosslinker.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the contact lens to the cornea and to have minimal adverse effects on corneal health.

One of lens forming materials widely used in making silicone hydrogel contact lenses is a polydiorganosiloxane (e.g., polydimethylsiloxane) vinylic crosslinker which can provide high oxygen permeability to resultant contact lenses. But, a polydimethylsiloxane vinylic crosslinker can affect the mechanical properties, e.g., elastic modulus, of the resultant contact lenses. For example, a low molecular weight polydimethylsiloxane vinylic crosslinker (<2,000 g/mol) may provide a resultant contact lens with a relatively high elastic modulus in order to achieve a desired oxygen permeability. A relative high molecular weight polydimethylsiloxane vinylic crosslinker is typically required for achieving both the high oxygen permeability and the low elastic modulus. However, because of its hydrophobic nature, a polydimethylsiloxane vinylic crosslinker, especially one with high molecular weight, is not compatible with hydrophilic components in a lens formulation, including, e.g., N,N-dimethylacrylamide, N-vinylpyrrolidone, N-vinyl-N-methylacetamide, or an internal wetting agent. It would be difficult to obtain homogeneous lens formulations (i.e., clear lens formulations) from use of such a polydimethylsiloxane vinylic crosslinker.

It would be even more difficult to obtain a homogeneous, solventless lens formulation from use of such a polydimethylsiloxane vinylic crosslinker. Use of organic solvents in preparing silicone hydrogel contact lens can be costly and is not environmentally friendly.

Therefore, there is a need for new hydophilized polydiorganosiloxane vinylic crosslinkers suitable for preparing a solventless lens formulation that can be used to produce silicone hydrogel contact lenses with long thermal stability.

Documents, including U.S. Pat. Nos. 4,260,725, 5,034, 461, 5,346,946, 5,416,132, 5,449,729, 5,486,579, 5,512,205, 5,760,100, 5,994,488, 6,858,218, 6,867,245, 7,671,156, 7,744,785, 8,129,442, 8,163,206, 8,501,833, 8,513,325, 8,524,850, 8,835,525, 8,993,651, and 9,187,601 and U.S. Pat. Appli. Pub. No. 2016/0090432 A1, disclose that various lens formulations (which are either solvent-containing or solventless formulations) comprising one or more hydrophilized polysiloxane crosslinkers can be used for making silicone hydrogel contact lenses.

SUMMARY OF THE INVENTION

The present invention, in one aspect, provides a hydrophilized polydiorganosiloxane vinylic crosslinker. The hydrophilized polydiorganosiloxane vinylic crosslinker of the invention comprises: (1) a polydiorganosiloxane polymer chain comprising dimethylsiloxane units and hydrophilized siloxane units each having one methyl substituent and one monovalent $C_4$-$C_{40}$ organic radical substituent having 2 to 6 hydroxyl groups, wherein the molar ratio of the hydrophilized siloxane units to the dimethylsiloxane units is from about 0.035 to about 0.15; (2) two terminal (meth)acryloyl groups, wherein the hydrophilized polydiorganosiloxane vinylic crosslinker has a number average molecular weight of from about 3000 Daltons to about 80,000 Daltons.

In another aspect, the invention provides a silicone hydrogel contact lens comprising a crosslinked polymeric material comprising: units of a hydrophilized polydiorganosiloxane vinylic crosslinker of the invention (described above), units of a siloxane-containing vinylic monomer, units of at least one hydrophilic vinylic monomer, wherein the silicone hydrogel contact lens, when being fully hydrated, has an oxygen permeability (Dk) of at least about 70 barrers, a water content of from about 25% to about 70% by weight, and an elastic modulus of from about 0.2 MPa to about 1.2 MPa.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises (a) from about 5% to about 35% by weight of a hydrophilized polydiorganosiloxane vinylic crosslinker of the invention, (b) a siloxane-containing vinylic monomer, (c) from about 30% to about 60% by weight of at least one hydrophilic vinylic monomer, (d) at least one free-radical initiator, provided that the above-listed polymerizable components and any additional polymerizable components add up to 100% by weight; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, and an elastic modulus of from about 0.2 MPa to about 1.2 MPa.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a crosslinked polymeric material which is insoluble in water, but can absorb at least 10 percent by weight of water.

A "silicone hydrogel" refers to a silicone-containing hydrogel obtained by copolymerization of a polymerizable composition comprising at least one silicone-containing vinylic monomer or at least one silicone-containing vinylic macromer or at least one actinically-crosslinkable silicone-containing prepolymer.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one $>C=C<$ group. Exemplary ethylenically unsaturated groups include without limitation (meth)acryloyl

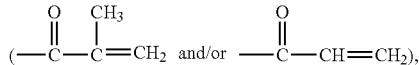

allyl, vinyl, styrenyl, or other C=C containing groups.

The term "ene group" refers to a monovalent radical comprising $CH_2=CH-$ that is not covalently attached to an oxygen or nitrogen atom or a carbonyl group.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

The term "(meth)acryloxy" refers to a group of

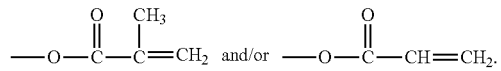

The term "(meth)acrylamido" refers to a group of

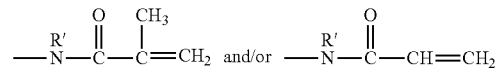

in which R' is hydrogen or $C_1$-$C_{10}$-alkyl.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "blending vinylic monomer" refers to a vinylic monomer capable of dissolving both hydrophilic and hydrophobic components of a polymerizable composition to form a solution.

A "macromer" or "prepolymer" refers to a compound or polymer that contains ethylenically unsaturated groups and has a number average molecular weights greater than 700 Daltons.

A "polymer" means a material formed by polymerizing/crosslinking one or more vinylic monomers, macromers and/or prepolymers.

"Molecular weight" of a polymeric material (including monomeric or macromeric materials), as used herein, refers to the number-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxyl, —$NH_2$, sulfhydryl, $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, the term "siloxane unit" refers to a divalent radical of —Si($^1R^2R$)—O— which has only two substituents, $^1R$ and $^2R$ which independently of each other are monovalent organic radicals and directly linked via one single bond to the silicon atom of the siloxane unit.

The term "monovalent organic radical" refers to a monovalent radical obtained by removing a hydrogen atom from an organic compound.

In this application, the term "methyl substituent" in reference to a siloxane unit refers to a methyl radical directly linked to the silicon atom of the siloxane unit; the term "monovalent $C_4$-$C_{40}$ organic radical substituent" in reference to a siloxane unit refers to a monovalent organic radical which comprises 4 to 40 carbon atoms and is directly linked to the silicon atom of the siloxane unit.

In this application, the term "hydrophilized siloxane unit" refers to a siloxane unit in which one of the two substituents on the silicon atom of the siloxane unit is a monovalent $C_4$-$C_{40}$ organic radical having at least one hydrophilic group or moiety (such as, hydroxyl, methoxy, carboxyl or amino group, or amide or amino bond).

In this application, a "hydrophilized polydiorganosiloxane vinylic crosslinker" refers to a polydiorganosiloxane vinylic crosslinker comprising at least one hydrophilized siloxane unit.

As used herein, the term "multiple" refers to three or more.

A "vinylic crosslinker" refers to a compound having at least two ethylenically-unsaturated groups. A "vinylic crosslinking agent" refers to a compound with two or more ethylenically unsaturated groups and with molecular weight less than 700 Daltons.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "polymerizable UV-absorbing agent" or "UV-absorbing vinylic monomer" refers to a compound comprising an ethylenically-unsaturated group and a UV-absorbing moiety.

A "UV-absorbing moiety" refers to an organic functional group which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800, 225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is any radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surfaces of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

"Surface modification" or "surface treatment", as used herein, means that an article has been treated in a surface treatment/modification process prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment or physical deposition of one or more layers of one or more hydrophilic polymer onto the surface of a contact lens disclosed in U.S. Pat. Nos. 8,147, 897 and 8,409,599 and U.S. Pat. Appl. Pub. Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (measured by Sessile Drop), which is obtained by averaging measurements of at least 3 individual contact lenses.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm\ Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)] \times 10^{-9}$.

The term "thermal stability" in reference to a silicone hydrogel contact lens means that the silicone hydrogel contact lens can be subjected up to 19 cycles of autoclaves (each for 30 minutes at 121° C.) in a phosphate-buffered saline (7.2±0.2) without significant autoclave-induced change (i.e., an increase or decrease) of about 10% or less, preferably about 5% or less) in at least one lens property selected from the group consisting of: elastic modulus E' (MPa), water content (WC %), lens diameter $D_{lens}$ (mm), and combinations thereof, relative to the corresponding lens property of the silicone hydrogel contact lens which is subjected to one sole autoclave for 30 minutes at 121° C.) in a phosphate-buffered saline (7.2±0.2). For example, the autoclave-induced change in a lens property ($\Delta \overline{LP_{AC}}$) is calculated based on the following equation $$\Delta \overline{LP_{AC}} = \left| \frac{\overline{LP_{nAC}} - \overline{LP_{1AC}}}{\overline{LP_{1AC}}} \right|$$

in which $\overline{LP_{1AC}}$ is the averaged value of the after-one-autoclave lens property of the soft contact lens and is obtained by averaging the values of the lens property of 15 soft contact lenses measured after being autoclaved one sole time for 30 minutes at 121° C. in a phosphate buffered saline at a pH of 7.2±0.2 and $\overline{LP_{nAC}}$ is the averaged value of the after-n-autoclaves lens property of the soft contact lens and is obtained by averaging the values of the lens property of 15 soft contact lenses measured after being stored and n cycles (times) of autoclaves each for 30 minutes at 121° C. in a phosphate buffered saline at a pH of 7.2±0.2. It is believed that the tests of autoclave-induced change in elastic modulus of silicone hydrogel contact lenses can be used in replacing traditional accelerated shelf-life studies at elevated temperature (e.g., 65° C. to 95° C.), in order to shorten significantly the time required for determining the equivalent shelf-life at room temperature.

As used in this application, the term "clear" in reference to a lens-forming composition means that the lens-forming composition is a transparent solution or liquid mixture (i.e., having a light transmissibility of 85% or greater, preferably 90% or greater in the range between 400 to 700 nm).

In general, the invention is directed to a class of hydrophilized polydiorganosiloxane vinylic crosslinkers which each comprise (1) a polydiorganosiloxane polymer chain comprising dimethylsiloxane units and hydrophilized siloxane units each having one methyl substituent and one monovalent $C_4$-$C_{40}$ organic radical substituent having two to six hydroxyl groups, wherein the molar ratio of the hydrophilized siloxane units to the dimethylsiloxane units is from about 0.035 to about 0.15; (2) two terminal (meth)acryloyl groups, wherein the hydrophilized polydiorganosiloxane vinylic crosslinker has a number average molecular weight of from about 3000 Daltons to about 80,000 Daltons.

This invention is partly based on the discovery that a hydrophilized polydiorganosiloxane vinylic crosslinker of the invention is suitable for preparing various solvent-containing or solventless lens formulations which can contain a large amount of hydrophilic polymerizable component and are still clear at room temperature or even at a low storage temperature of from about 0° C. to about 4° C. It is believed that a hydrophilized polydiorganosiloxane vinylic crosslinker of the invention can contain a relatively-large amount of hydroxyl group per molecule and thereby should be more compatible with other hydrophilic polymerizable components (e.g., hydrophilic vinylic monomer, hydrophilic crosslinking agent, and/or hydrophilic prepolymer), because of the hydrogen-bonding capability of hydroxyl group. With its capability of being stored at a low storage temperature of from about 0° C. to about 4° C., such a lens formulation can be advantageously prepared in advance in the production.

This invention is also partly based on the discovery that a polydiorganosiloxane vinylic crosslinker of the invention (i.e., having an unique combination of a selected molar ratio of hydrophilized siloxane units over dimethylsiloxane units and a selected number average molecular weight) can be used in a lens formulation containing a relatively large amount of hydrophilic polymerizable components to produce silicone hydrogel contact lens which can have a relatively-high oxygen permeability and a relatively low-elastic modulus. It is believed that in order to achieve a higher oxygen permeabily, a polydiorganosiloxane should have at least 5 dimethylsiloxane units in a consecutive sequence. By packing densely hydroxyl groups into a limited number of siloxane units, a hydrophilized polydiorganosiloxane vinylic crosslinker of the invention can have a relatively low molar ratio of hydrophilized siloxane units over dimethylsiloxane units, ensuring that siloxane segments consists of more than 5 consecutive dimethylsiloxane units. By selecting a combination of a molar ratio of hydrophilized siloxane units over dimethylsiloxane units and a molecular weight, a polydiorganosiloxane vinylic crosslinker of the invention can have a relatively-high contribution to oxygen permeability per siloxane unit, a relatively-high compatibility with hydrophilic polymerizable components due to a large number of hydroxyl groups per molecule, and a relatively-low elastic modulus contribution due to the relatively large molecular weight.

When a hydrophilized polydiorganosiloxane vinylic crosslinker of the invention is used in a silicone hydrogel lens formulation, silicone hydrogel contact lenses obtained from the lens formulation can have superior lens stability, because of stable backbones of the polydiorganosiloxane polymer chains and the monovalent $C_4$-$C_{40}$ organic radical substituent of hydrophilized siloxane units. A hydrophilized polydiorganosiloxane vinylic crosslinker of the invention is designed to have stable backbones and side chains, free of unstable bonds (such as, urea bond, urethane bond, polyethylene glycol segment) which are susceptible of cleavage due to hydrolysis, photolysis, poor thermal stability, and/or oxidation.

The present invention, in one aspect, provides a polydiorganosiloxane vinylic crosslinker. The polydiorganosiloxane vinylic crosslinker of the invention comprises: (1) a polydiorganosiloxane polymer chain comprising dimethylsiloxane units and hydrophilized siloxane units each having one methyl substituent and one monovalent $C_4$-$C_{40}$ organic radical substituent having two to six hydroxyl groups, wherein the molar ratio of the hydrophilized siloxane units to the dimethylsiloxane units is from about 0.035 to about 0.15; (2) two terminal (meth)acryloyl groups, wherein the polydiorganosiloxane vinylic crosslinker has a number average molecular weight of from about 3000 Daltons to about 80,000 Daltons (preferably from about 4000 Daltons to about 50,000 Dalton, more preferably from about 5000 Daltons to about 25,000 Daltons, even more preferably from about 6000 Daltons to about 18,000 Daltons).

In accordance with a preferred embodiment, a polydiorganosiloxane vinylic crosslinker of the invention is a polymer of formula (1)

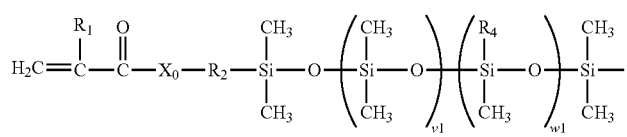
(1)

in which:
- υ1 is an integer of from 30 to 500 and ω1 is an integer of from 1 to 75, provided that ω1/υ1 is from about 0.035 to about 0.15 (preferably from about 0.040 to about 0.12, even more preferably from about 0.045 to about 0.10);
- $X_0$ is O or NR' in which R' is hydrogen or $C_1$-$C_{10}$-alkyl;
- $R_1$ is hydrogen or methyl;
- $R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;
- $R_4$ is a monovalent radical of any one of formula (2) to (6)

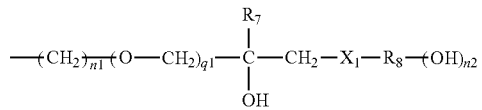
(2)

(3)

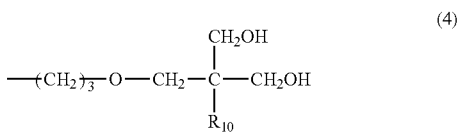
(4)

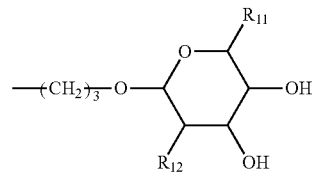
(5)

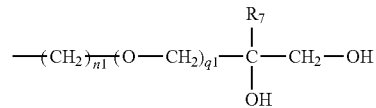
(6)

- q1 is zero or 1;
- n1 is an integer of 2 to 4;
- n2 is an integer of 1 to 5;
- n3 is an integer of 3 to 6;
- n4 is an integer of 2 to 5
- $R_7$ is hydrogen or methyl;
- $R_8$ and $R_9$ independent of each other are a $C_2$-$C_6$ hydrocarbon radical having (n2+1) valencies;
- $R_{10}$ is ethyl or hydroxymethyl;
- $R_{11}$ is methyl or hydromethyl;
- $R_{12}$ is hydroxyl or methoxy;
- $X_1$ is a sulfur linkage of —S— or a tertiary amino linkage of —$NR_{13}$— in which $R_{13}$ is $C_1$-$C_1$ alkyl, hydroxyethyl, hydroxypropyl, or 2,3-dihydroxypropyl; and
- $X_2$ is an amide linkage of

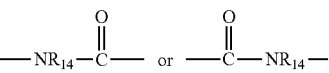 or 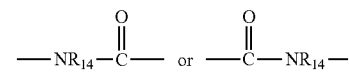

in which $R_{14}$ is hydrogen or $C_1$-$C_{10}$ alkyl.

In a preferred embodiment, $R_4$ is a monovalent radical of one of formula (2a) to (2y).

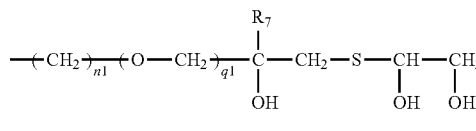
(2a)

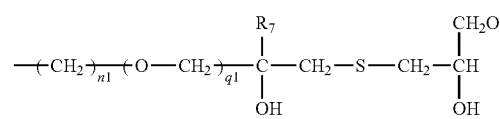
(2b)

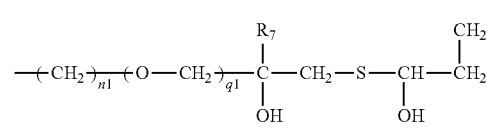
(2c)

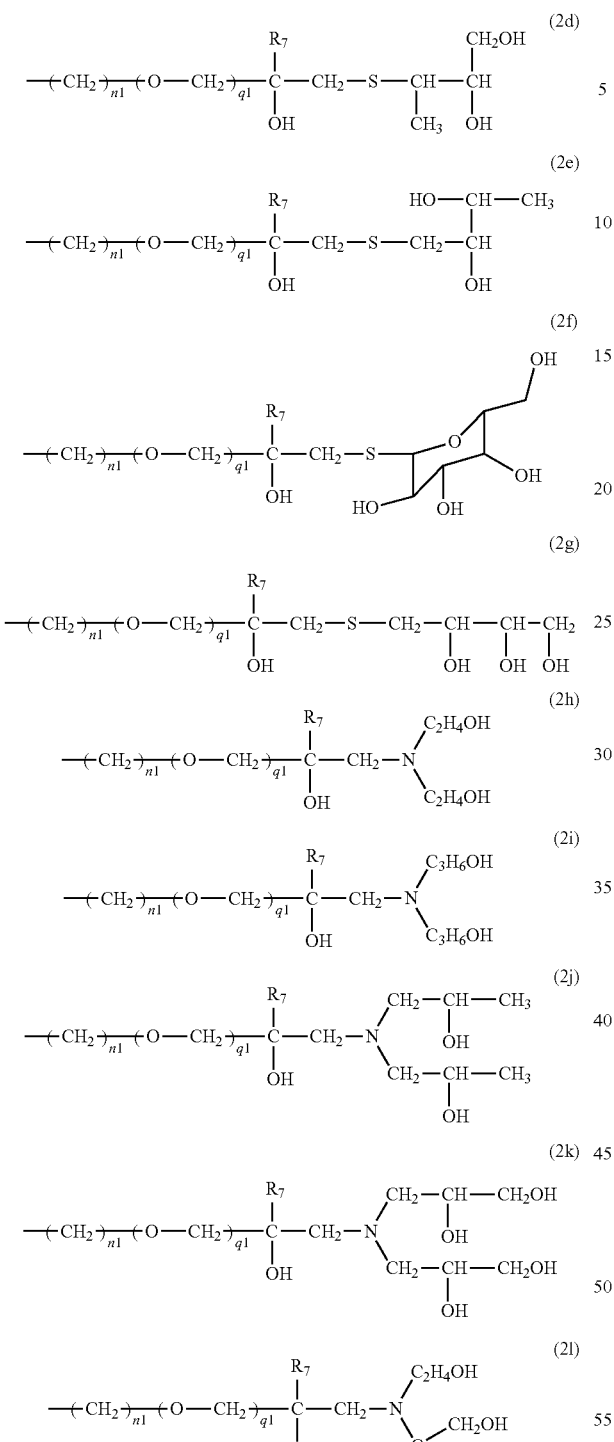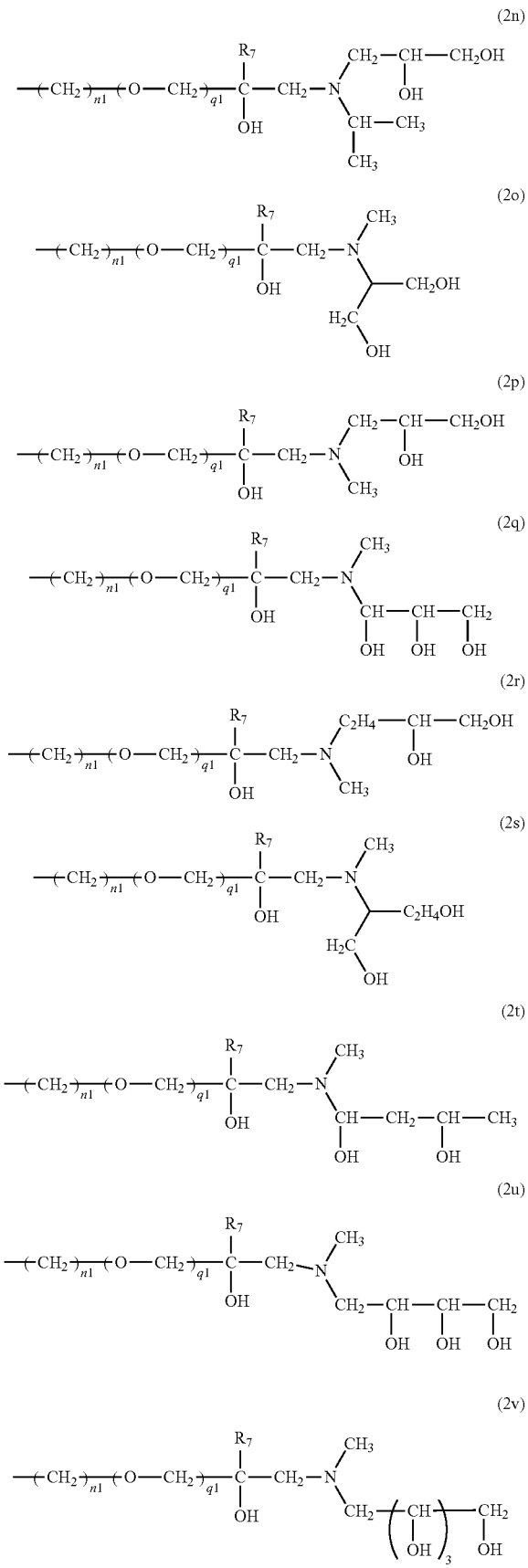

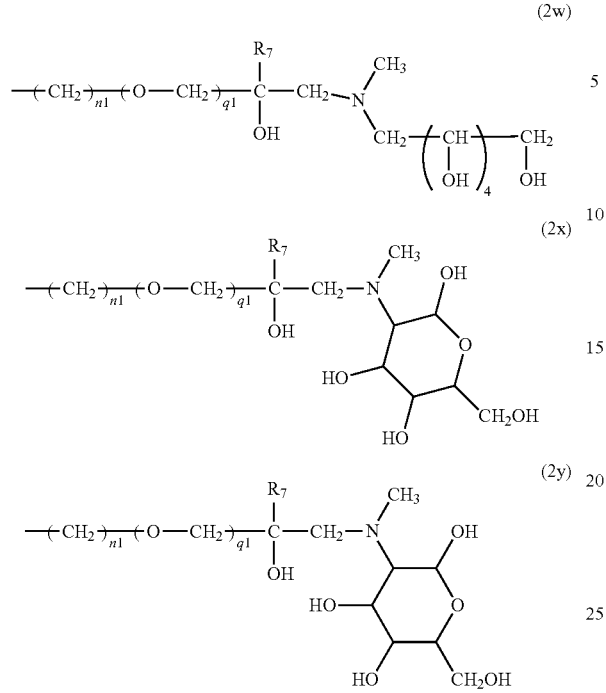
in which q1 is zero or 1 (preferably 1), n1 is an integer of 2 to 4 (preferably 3), $R_7$ is hydrogen or methyl (preferably hydrogen).
In another preferred embodiment, $R_4$ a monovalent radical of one of formula (3a) to (3y).
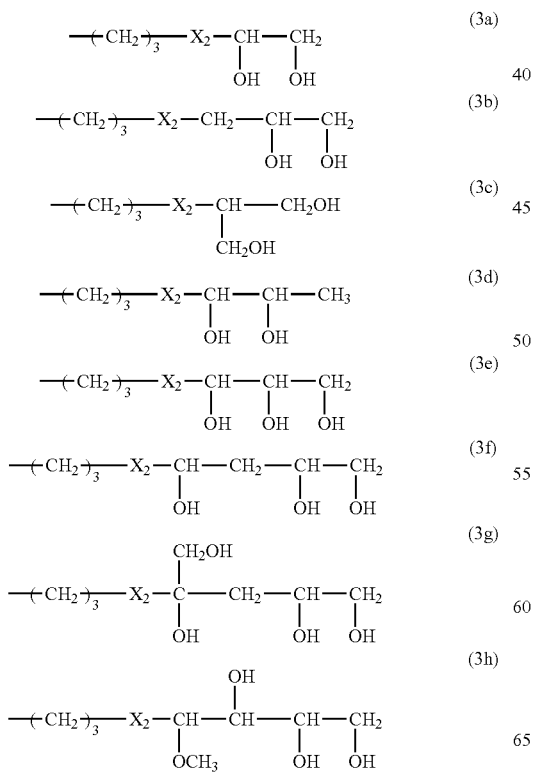
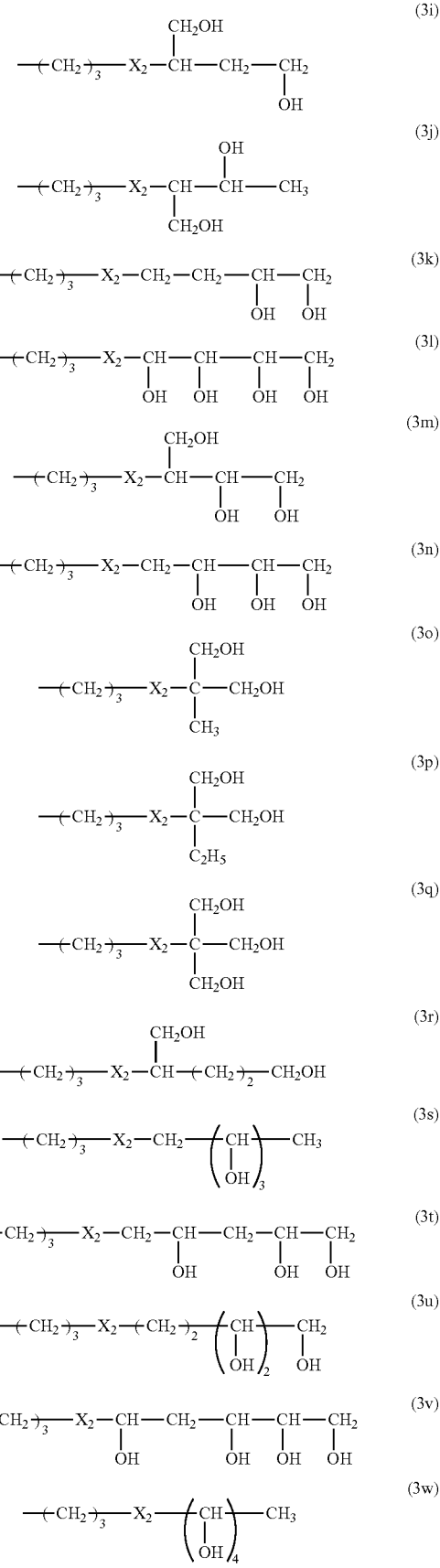

-continued

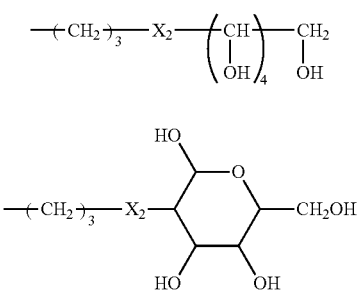

(3x)

(3y)

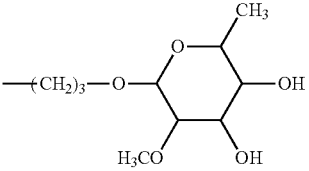

(5c)

In another preferred embodiment, the monovalent radical $R_4$ is a radical of formula (6) in which n1 is 3 and q1 is 1.

A polydiorganosiloxane vinylic crosslinker of formula (1) can be prepared by reacting a hydrosiloxane-containing polydiorganosiloxane of formula (7) with an ene monomer containing 2 to 5 hydroxyl group

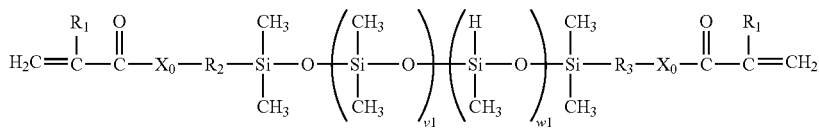

(7)

in which $X_2$ is an amide linkage of

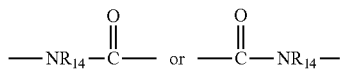

in which $R_{14}$ is hydrogen or $C_1$-$C_{10}$ alkyl.

In another preferred embodiment, $R_4$ is a monovalent radical of formula (4a) or (4b).

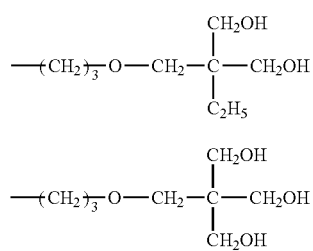

(4a)

(4b)

In another preferred embodiment, $R_4$ a monovalent radical of one of formula (5a) to (5c).

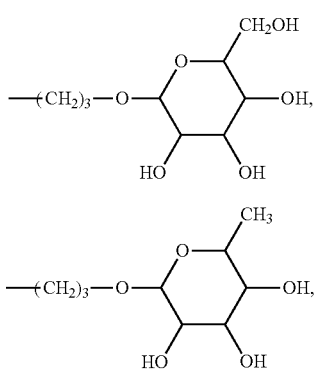

(5a)

(5b)

in which $X_0$, $R_1$, $R_2$, $R_3$, $\upsilon 1$, and $\omega 1$ are as defined above, in a platinum-catalyzed hydrosilylation reaction as known to a person skilled in the art.

Hydrosiloxane-containing polysiloxane of formula (7) can be prepared according to any methods known to a person skilled in the art. As an illustrative example, a hydrosiloxane-containing polysiloxane of formula (7) can be prepared from polymerization of a mixture of octamethylcyclotetrasiloxane (D4) and 1,3,5,7-tetramethylcyclotetrasiloxane (H4) in presence of 1,3-bis[3-(meth)acryloxypropyl] tetramethyldisiloxane as a chain end block and in the presence of a catalyst. By controlling the molar ratio of D4 to H4, a desired value of $\upsilon 1/\omega 1$ can be obtained.

Where in formula (1) $R_4$ is a monovalent radical of formula (4), (5) or (6), the ene monomer preferred is 3-allyoxy-1,2-propanediol, 2-allyloxymethyl-2-(hydroxymethyl)-1,3-propanediol, 2-allyloxymethyl-2-ethyl-1,3-propanediol (i.e., trimethylolpropaneallylether), allyl α-D-mannopyranoside, allyl α-D-galactopyranoside, allyl 6-deoxyhexopyranoside, ally 6-deoxy-2-O-methylhexopyranoside, or a fully-hydrolized (i.e., ring-opening) product of an epoxy-containing ene monomer which is allyloxy glycidyl ether, 1,2-ppoxy-5-hexene, 3,4-epoxy-1-butene, or 2-methyl-2-vinyloxirane. The above-listed ene monomers are commercially available.

Where in formula (1) $R_4$ is a monovalent radical of formula (2), the ene monomer preferred is a reaction product of an epoxy-containing ene monomer with a mercaptan having 2 to 5 hydroxyl groups or a secondary amine having 2 to 5 hydroxyl groups. Examples of commercially available epoxy-containing ene monomers include without limitation allyloxy glycidyl ether, 1,2-ppoxy-5-hexene, 3,4-epoxy-1-butene, and 2-methyl-2-vinyloxirane. Examples of commercially available mercaptans having 2 to 4 hydroxyl groups include without limitation 1-mercaptoethane-1,2-diol, 2-mercaptopropane-1,3-diol, 3-mercaptopropane-1,2-diol, 3-mercaptobutane-1,2-diol, 1-mercaptobutane-2,3-diol, 4-mercapto-1,2,3-butanetriol, and 2-mercapto-6-methylol-tetrahydropyran-3,4,5-triol. Examples of commercially available secondary amines having 2 to 4 hydroxyl groups include without limitation bis(2-hydroxyethyl)amine, bis(2- hydroxypropyl)amine, bis(3-hydroxypropyl)amine, bis-(2, 3-dihydroxypropyl)amine, isopropylamino-1,2-propanediol, 2-(2-hydroxethylamino)-2-(hydroxymethyl)-1,3-propanediol, 2-(ethylamino)-1,3-butanediol, 6-ethylamino-1,2,4-cyclohexanetriol, 3-(methylamino)-6-methylol-tetrahydropyrantriol, 3-(ethylamino)-6-methylol-tetrahydropyrantriol, 3-methylamino-1,2-propanediol, 2-methylamino-1,3-propanediol, 1-(Methylamino)-1,2,3-propanetriol, 4-methylamino-1,2-butanediol, 2-methylamino-1,4-butanediol, 2-methylamino-1,3-butanediol, N-methyl-2,3,4-trihydroxybutylamine, N-methyl-2,3,4,5-tetradroxypentylamine, N-methyl-2,3,4,5,6-pentadroxyhexylamine. Reactions between an epoxide and a mercaptan (to form a thiol ether linakge) and between an epoxide and a secondary amine (to form an amino linakge) are well known to a person skilled in the art and have been described in the literature.

Where in formula (1) $R_4$ is a monovalent radical of formula (3), the ene monomer preferred is a reaction product of either (1) a carboxy-containing ene monomer with a primary or secondary amine having 2 to 5 hydroxyl groups or (2) a primary amino-containing or secondary amino-containing ene monomer with an alkanoic acid having 2 to 5 hydroxyl groups, according to the well-known coupling reaction between one carboxylic acid group and one amino (primary or secondary) group in the presence of 1-ethyl-3-(3-dimethylaminopropyl) carbodiimide (EDC) and N-hydroxysuccinimide (HO—NHS), to obtain an ene monomer having 2 to 5 hydroxyl groups and an amide linkage. Examples of commercially available carboxy-containing ene monomers include without limitation 3-butenoic acid, 4-pentenoic acid, 5-hexenoic acid, and 6-heptenoic acid. Examples of commercially available primary or secondary amino-containing ene monomers include without limitation allylamine, 3-butenylamine, 4-pentenylamine, 1-methyl-4-pentenylamine, 5-hexenylamine, 5-heptenylamine, 6-heptenylamine, N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, and N-allyl-1-heptanamine. Examples of commercially available alkanoic acids having 2 to 5 hydroxyl groups include without limitation 2,3-dihydroxypropanoic acid, 2,3-dihydroxybutanoic acid, 3,4-dihydroxybutanoic acid, 2,3,4-trihydroxybutanoic acid, 2,4,5-acid, 2,4,5-trihydroxy-2-(hydroxymethyl)pentanoic acid, 3,4,5-trihydroxy-2-trihydroxypentanoic methoxypentanoic acid, xylonic acid (2,3,4,5-tetrahydroxypantanoic acid), 3,4,5-trihydroxyhexanoic acid, 3,5,6-trihydroxyhexanoic acid, 4,5,6-trihydroxyhexanoic acid, 2,4,5,6-tetrahydroxyhexanoic acid, 2,3,4,5-tetrahydroxyhexanoic acid, 2,3,4,5,6-pentahydroxyhexanoic acid. Examples of commercially available primary amines having 2 to 5 hydroxyl groups include without limitation dihydroxyethylamine, 2,3-dihydropropylamine, 2-amino-1,3-propanediol, 2-amino-1,4-butanediol, 2-amino-1,3-butanediol, 4-amino-1,2-butanediol, 2-amino-1,3,4-butanetriol, 4-amino-1,2,3-butanetriol, 2-amino-2-methyl-1,3-propanediol, 2-amino-2-ethyl-1,3-propanediol, 2-amino-2-(hydroxymethyl)-1,3-propanediol, 2-amino-1,5-pentanediol, and 3-amino-6-hydroxymethyl-tetrahydropyran-2,4,5-triol. The above-listed commercially-available secondary amines having 2 to 5 hydroxyl groups can be used in the reaction with a carboxy-containing ene monomer to obtain an ene monomer having multiple hydroxyl groups and an amide linkage. The reaction between a carboxylic acid group and a primary or secondary amino group to form an amide linkage is well known to a person skilled in the art and has been described extensively in the literature.

A polydiorganosiloxane vinylic crosslinker of the invention (formula (1) as defined above) can find particular use in preparing a polymer, preferably a silicone hydrogel polymeric material, which is another aspect of the invention. A person skilled in the art knows how to prepare a polymer or a silicone hydrogel polymeric material from a polymerizable composition according to any known polymerization mechanism.

In another aspect, the invention provides a silicone hydrogel contact lens comprising a crosslinked polymeric material comprising: units of a polydiorganosiloxane vinylic crosslinker of formula (1) (as defined above), units of a siloxane-containing vinylic monomer, units of at least one hydrophilic vinylic monomer, wherein the silicone hydrogel contact lens, when being fully hydrated, has an oxygen permeability (Dk) of at least about 70 barrers (preferably at least about 80 barrers, more preferably at least about 90 barrers, even more preferably at least about 100 barrers), a water content of from about 25% to about 70% by weight (preferably from about 30% to about 65% by weight, more preferably from about 35% to about 60% by weight, even more preferably from about 40% to about 55% by weight), and an elastic modulus of from about 0.20 MPa to about 1.2 MPa (preferably from about 0.25 MPa to about 1.0 MPa, more preferably from about 0.3 MPa to about 0.9 MPa, even more preferably from about 0.4 MPa to about 0.8 MPa). Preferably, the silicone hydrogel contact lens has a thermal stability as characterized by having an autoclave-induced change $$\left| \frac{LP_{19AC} - LP_{1AC}}{LP_{1AC}} \right|$$

of about 10% or less (preferably about 8% or less, more preferably about 6% or less, even more preferably about 4% or less) in at least one lens property (LP) selected from the group consisting of elastic modulus, water content, lens diameter, and combinations thereof, wherein $\overline{LP_{1AC}}$ is the averaged value of the lens property after one-autoclave and is obtained by averaging the values of the lens property of 15 soft contact lenses measured after being autoclaved one sole time for 30 minutes at 121° C. in a phosphate buffered saline at a pH of 7.2±0.2 and $\overline{LP_{19AC}}$ is the averaged values of the lens property after 19-autoclaves and is obtained by averaging the values of the les properties of 15 soft contact lenses measured after being stored and autoclaved 19 times each for 30 minutes at 121° C. in a phosphate buffered saline at a pH of 7.2±0.2.

A person skilled in the art knows well how to measure the oxygen permeability, oxygen transmissibility, water content, elastic modulus, and lens diameter of silicone hydrogel contact lenses. These lens properties have been reported by all manufacturers for their silicone hydrogel contact lens products.

Various embodiments of a polydiorganosiloxane vinylic crosslinker of formula (1) (as defined above) should be incorporated into this aspect of the invention.

Any suitable siloxane-containing vinylic monomers can be used in the invention. A class of preferred siloxane-containing vinylic monomers is those containing a tris (trialkylsiloxy)silyl group or a bis(trialkylsilyloxy)alkylsilyl group. Examples of such preferred silicone-containing vinylic monomers include without limitation 3-acrylamidopropyl-bis(trimethylsiloxy)methylsilane, 3-N-methyl acrylamidopropylbis(trimethylsiloxy)methylsilane, N-[tris(trimethylsiloxy)silylpropyl]-meth)acrylamide, (N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxyethoxypropyloxy-propyl-bis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, and hydrophlized siloxane-containing vinylic monomers disclosed in U.S. Pat. Nos. 9,103,965, 9,475,827, and 9,097,840 (herein incorporated by references in their entireties) which comprise at least one hydrophilic linkage and/or at least one hydrophilic chain.

Another class of preferred siloxane-containing vinylic monomers is polycarbosiloxane vinylic monomers (or carbosiloxane vinylic monomers). Examples of such polycarbosiloxane vinylic monomers or macromers are those described in U.S. Pat. Nos. 7,915,323 and 8,420,711, in US Pat. Appl. Pub. Nos. 2012/244088, 2012/245249, 2015/0309211, and 2015/0309210 (herein incorporated by references in their entireties).

A further class of preferred siloxane-containing vinylic monomers is polydimethylsiloxane-containing vinylic monomers. Examples of such polydimethylsiloxane-containing vinylic monomers are mono-(meth)acryloxy-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane), mono-(meth)acrylamido-terminated polydimethylsiloxanes of various molecular weight, or combinations thereof.

In accordance with the invention, a siloxane-containing vinylic monomer is preferably 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloxy-terminated polydimethylsiloxanes of various molecular weight, mono-(meth)acrylamido-terminated polydimethylsiloxanes of various molecular weight, or a combination thereof.

It is understood that the crosslinked polymeric material of a silicone hydrogel contact lens of the invention can optionally comprise a polydimethylsiloxane vinylic crosslinker so long it is compatible with the hydrophilic polymerizable components in a lens-forming composition for making the silicone hydrogel contact lens.

Examples of preferred hydrophilic vinylic monomers include without limitation N-vinylpyrrolidone, N,N-dimethyl (meth)acrylamide, (meth)acrylamide, hydroxyethyl (meth)acrylamide, N-hydroxypropyl (meth)acrylamide, hydroxyethyl (meth)acrylate, glycerol methacrylate (GMA), polyethylene glycol (meth)acrylate having a number average molecular weight of up to 1500, polyethylene glycol $C_1$-$C_4$-alkyl ether (meth)acrylate having a number average molecular weight of up to 1500, N-[tris(hydroxymethyl)methyl]-acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, and combinations thereof. Preferably, the hydrophilic vinylic monomer is a hydrophilic N-vinyl monomer, such as, N-vinylpyrrolidone, N-vinyl-N-methyl acetamide, N-vinyl formamide, N-vinyl acetamide, N-vinyl isopropylamide, or combinations thereof. Even more preferably, the hydrophilic vinylic monomer is N-vinylpyrrolidone, N-vinyl-N-methyl acetamide, or combinations thereof.

In accordance with the invention, the crosslinked polymeric material of a silicone hydrogel contact lens of the invention can further comprise units of a hydrophobic vinylic monomer free of silicone, units of a non-silicone vinylic crosslinker, units of a UV-absorbing vinylic monomer, or a combination thereof.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred non-silicone crosslinkers include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate diglycerolate di-(meth)acrylate, ethylenebis[oxy(2-hydroxypropane-1,3-diyl)] di-(meth)acrylate, bis[2-(meth)acryloxyethyl] phosphate, tri methylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N- ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), vinyl methacrylate, allylmethacrylate, allylacrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, a product of diamine (preferably selected from the group consisting of N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferrably selected from the group consisting of glycidyl (meth)acrylate, vinyl glycidyl ether, allyl glycidyl ether, and combinations thereof), combinations thereof).

A more preferred crosslinker is selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, glycerol dimethacrylate, allyl (meth)acrylate, N,N'-methylene bis(meth)acrylamide, N,N'-ethylene bis(meth)acrylamide, N,N'-dihydroxyethylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), triallyl isocyanurate, tetraethyleneglycol divinyl ether, triethyleneglycol divinyl ether, diethyleneglycol divinyl ether, ethyleneglycol divinyl ether, and combinations thereof.

Examples of preferred UV-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-(2'-hydroxy-5'-methacryloxyethylphenyl) benzotriazole (2-Propenoic acid, 2-methyl-, 2-[3-(2H-benzotriazol-2-yl)-4-hydroxyphenyl] ethyl ester, Norbloc), 2-{2'-Hydroxy-3'-tert-butyl-5'-[3'-methacryloyloxypropoxy]phenyl}-5-methoxy-2H-benzotriazole (UV13), 2-[2'-Hydroxy-3'-tert-butyl-5'-(3'-acryloyloxypropoxy)phenyl]-5-trifluoromethyl-2H-benzotriazole ($CF_3$-UV13), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0).

In a preferred embodiment, a silicone hydrogel contact lens comprises from about 30% to about 60% by weight of the units of said at least one hydrophilic vinylic monomer, wherein the weight percentage of the units of said at least one hydrophilic vinylic monomer is the weight percentage of said at least one hydrophilic vinylic monomer relative to the total weight of all polymerizable components in a polymerizable composition for making the crosslinked polymeric material.

A silicone hydrogel contact lens can be prepared from a lens-forming composition according to a method of the invention which is another aspect of the invention.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises (a) from about 5% to about 35% by weight of a polydiorganosiloxane vinylic crosslinker of formula (1) (as defined above), (b) a siloxane-containing vinylic monomer, (c) from about 30% to about 60% by weight of at least one hydrophilic vinylic monomer, (d) at least one free-radical initiator, provided that the above-listed polymerizable components and any additional polymerizable components add up to 100% by weight; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa, and a thermal stability as characterized by having an autoclave-induced change $$\left|\frac{\overline{LP_{19AC}} - \overline{LP_{1AC}}}{\overline{LP_{1AC}}}\right|$$

of about 10% or less in at least one lens property (LP) selected from the group consisting of elastic modulus, water content, lens diameter, and combinations thereof, wherein $\overline{LP_{1AC}}$ is the averaged value of the lens property after one-autoclave and is obtained by averaging the values of the lens property of 15 soft contact lenses measured after being autoclaved one sole time for 30 minutes at 121° C. in a phosphate buffered saline at a pH of 7.2±0.2 and $\overline{LP_{19AC}}$ is the averaged values of the lens property after 19-autoclaves and is obtained by averaging the values of the les properties of 15 soft contact lenses measured after being stored and autoclaved 19 times each for 30 minutes at 121° C. in a phosphate buffered saline at a pH of 7.2±0.2.

Various embodiments described above of a polydiorganosiloxane vinylic crosslinker of formula (1) (as defined above) should be incorporated into this aspect of the invention.

Various embodiments described above of a siloxane-containing vinylic monomer, a hydrophilic vinylic monomer should be incorporated in this aspect of the invention.

In accordance with the invention, a free-radical initiator can be a thermal initiator or photoinitiator.

Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis (1-cyclohexanecarbonitrile), 2,2'-azo-bis(2,4-dimethyl-valeronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Where a vinylic monomer capable of absorbing ultra-violet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190 (herein incorporated by reference in its entirety). Preferably, the monomer of lens-forming materials comprises at least one of the following acylgermanium compounds.

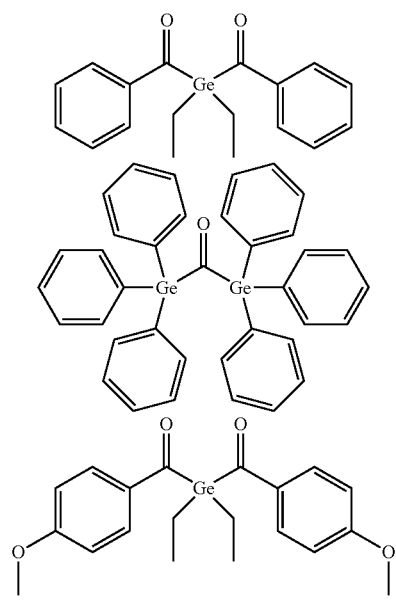

In a preferred embodiment, the lens-forming composition comprises an organic solvent.

Example of suitable solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3- hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In another preferred embodiment, a lens-forming composition is a solution of all the desirable components dissolved in 1-propanol, isopropanol, tert-amyl alcohol, 1,2-propylene glycol, a polyethyleneglycol having a molecular weight of about 400 Daltons or less, or a mixture thereof.

In another preferred embodiment, the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof. Preferably, the blending vinylic monomer is methylmethacrylate.

In another preferred embodiment, the total amount of all silicone-containing polymerizable components present in the lens-forming composition is about 65% or less.

In another preferred embodiment, the hydrophilic vinylic monomer is a hydrophilic N-vinyl monomer, preferably is N-vinylpyrrolidone, N-vinyl-N-methyl acetamide, N-vinyl formamide, N-vinyl acetamide, N-vinyl isopropylamide, or combinations thereof, even more preferably is N-vinylpyrrolidone, N-vinyl-N-methyl acetamide, or combinations thereof.

In another preferred embodiment, the lens-forming composition further comprises a non-silicone vinylic crosslinker. Various embodiments described above of a siloxane-containing vinylic monomer, a hydrophilic vinylic monomer should be incorporated in this aspect of the invention. The amount of a non-silicone vinylic crosslinker used is expressed in the weight content with respect to the total polymerizable components and is preferably in the range from about 0.05% to about 2%, and more preferably in the range from about 0.1% to about 1.5%, even more preferably in the range from about 0.15% to about 1.0%.

In accordance with the invention, the lens-forming composition can further comprise other components, such as, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002, which are also incorporated herein by reference in their entireties.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, the lens-forming formulation (or composition) can be introduced (dispensed) into a cavity formed by a mold according to any known methods.

After the lens-forming composition is dispensed into the mold, it is polymerized to produce a contact lens. Cross-linking may be initiated thermally or actinically.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

In a preferred embodiment, the resultant silicone hydrogel contact lens is extracted with water or an aqueous solution.

In another preferred embodiment, the mold is a reusable mold and the lens-forming composition is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, and combinations thereof.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A polydiorganosiloxane vinylic crosslinker, comprising: (1) a polydiorganosiloxane polymer chain comprising dimethylsiloxane units and hydrophilized siloxane units each having one methyl substituent and one monovalent $C_4$-$C_{40}$ organic radical substituent having two to six hydroxyl groups, wherein the molar ratio of the hydrophilized siloxane units to the dimethylsiloxane units is from about 0.035 to about 0.15; (2) two terminal (meth)acryloyl groups, wherein the polydiorganosiloxane vinylic crosslinker has a number average molecular weight of from about 3000 Daltons to about 80,000 Daltons.

2. The polydiorganosiloxane vinylic crosslinker according to invention 1, wherein the polydiorganosiloxane vinylic crosslinker is a polymer of formula (1)

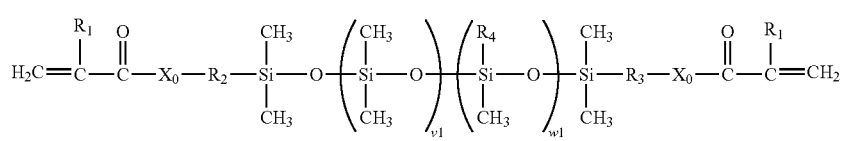

in which:

υ1 is an integer of from 30 to 500 and ω1 is an integer of from 1 to 75, provided that ω1/υ1 is from about 0.035 to about 0.15;

$X_0$ is O or NR' in which R' is hydrogen or $C_1$-$C_{10}$-alkyl;

$R_1$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (6)

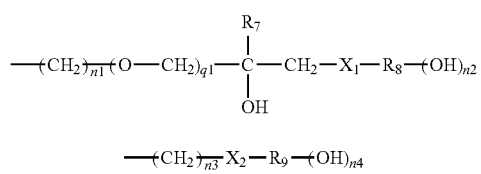

(2)

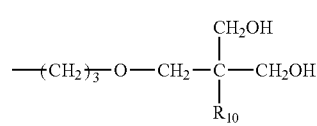

(3)

—(CH$_2$)$_{\overline{n3}}$—X$_2$—R$_9$—(OH)$_{n4}$ (4)

—(CH$_2$)$_{\overline{3}}$—O—CH$_2$—C(CH$_2$OH)(R$_{10}$)—CH$_2$OH

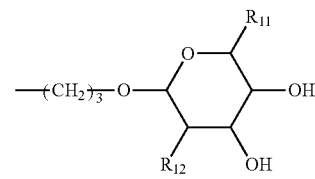

(5)

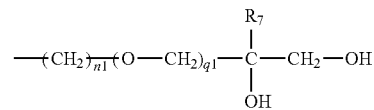

(6)

q1 is zero or 1;
n1 is an integer of 2 to 4;
n2 is an integer of 1 to 5;
n3 is an integer of 3 to 6;
n4 is an integer of 2 to 5
$R_7$ is hydrogen or methyl;
$R_8$ and $R_9$ independent of each other are a $C_2$-$C_6$ hydrocarbon radical having (n2+1) valencies;
$R_{10}$ is ethyl or hydroxymethyl;
$R_{11}$ is methyl or hydromethyl;
$R_{12}$ is hydroxyl or methoxy;
$X_1$ is a sulfur linkage of —S— or a teriary amino linkage of —NR$_{13}$— in which $R_{13}$ is $C_1$-$C_3$ alkyl, hydroxylethyl, hydroxypropyl, or 2,3-dihydroxypropyl; and $X_2$ is an amide linkage of —NR$_{14}$—C(=O)—  or  —C(=O)—NR$_{14}$— in which $R_{14}$ is hydrogen or $C_1$-$C_{10}$ alkyl.

3. The polydiorganosiloxane vinylic crosslinker according to invention 2, wherein in formula (1) ω1/υ1 is from about 0.040 to about 0.12.

4. The polydiorganosiloxane vinylic crosslinker according to invention 2, wherein in formula (1) ω1/υ1 is from about 0.045 to about 0.10.

5. The polydiorganosiloxane vinylic crosslinker according to any one of inventions 2 to 4, wherein $R_4$ is a monovalent radical of formula (2).

6. The polydiorganosiloxane vinylic crosslinker according to invention 5, wherein $R_4$ is a monovalent radical of any one of formula (2a) to (2y)

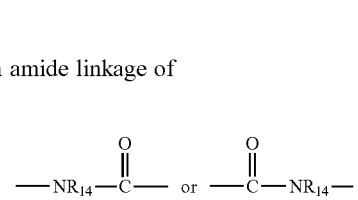

(2a)

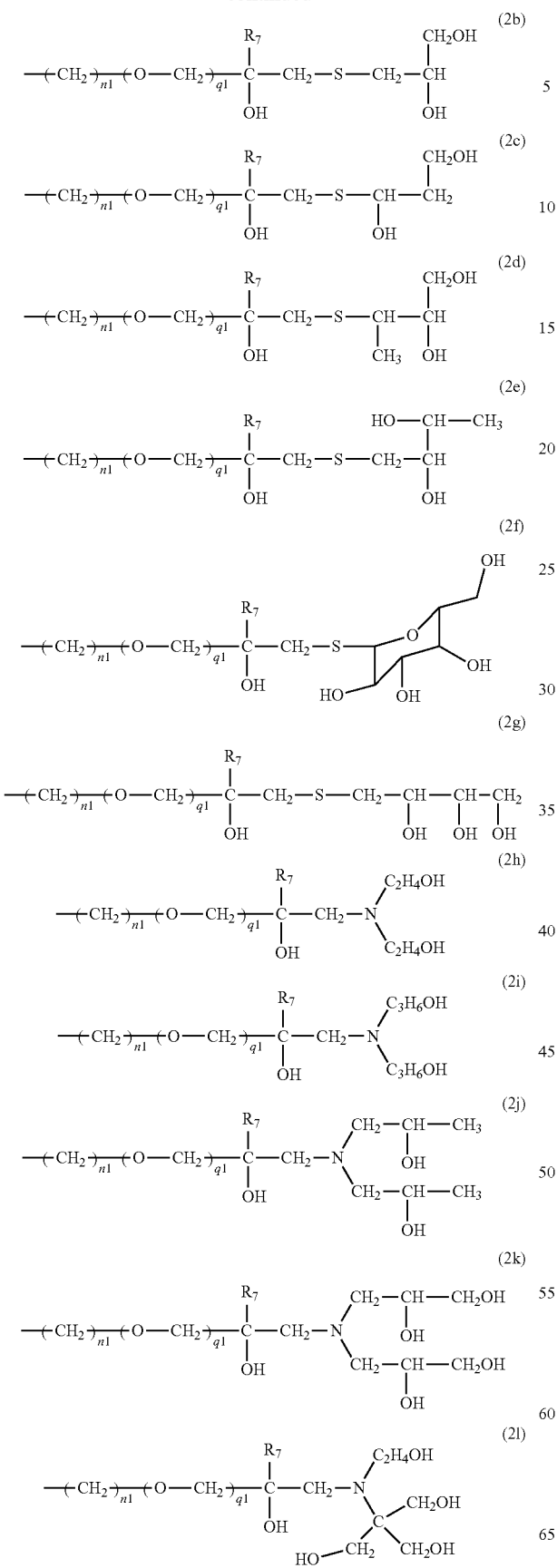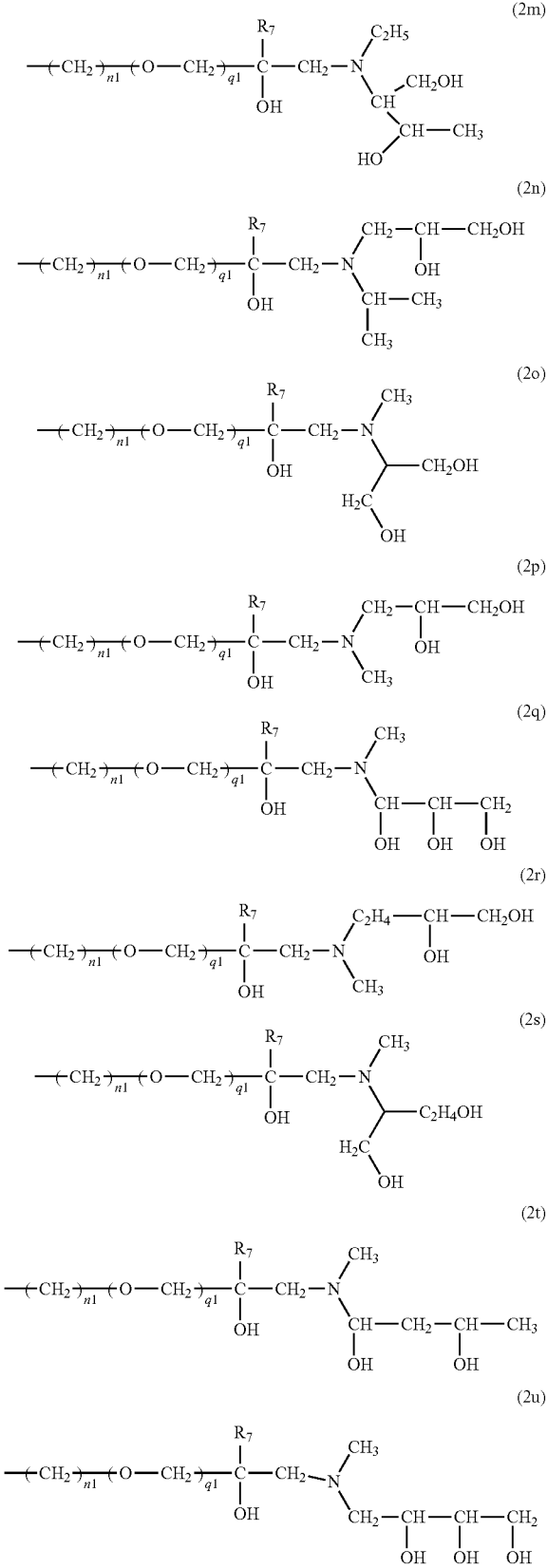

-continued
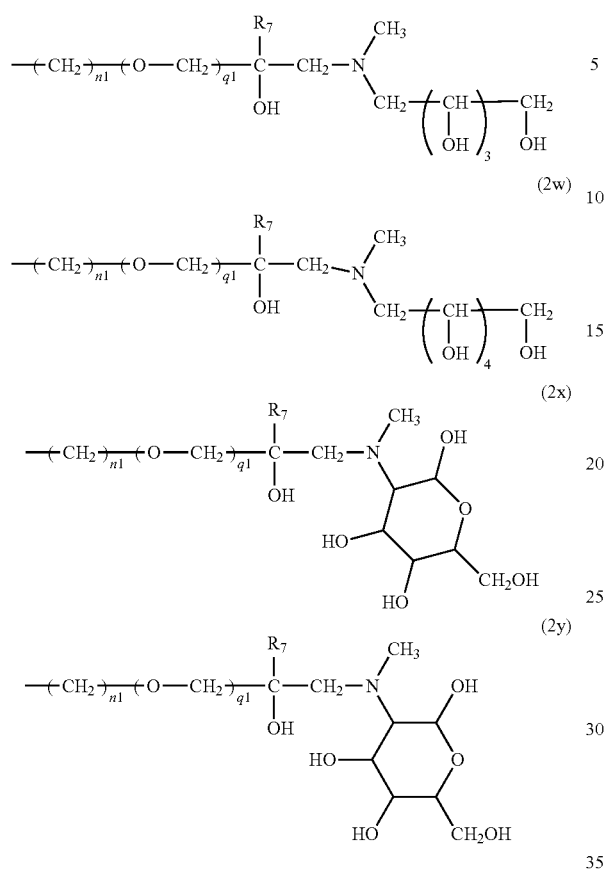
in which q1 is zero or 1, n1 is an integer of 2 to 4, $R_7$ is hydrogen or methyl.
7. The polydiorganosiloxane vinylic crosslinker according to any one of inventions 2 to 4, wherein $R_4$ is a monovalent radical of formula (3).
8. The polydiorganosiloxane vinylic crosslinker according to invention 7, wherein $R_4$ is a monovalent radical of any one of formula (3a) to (3y)
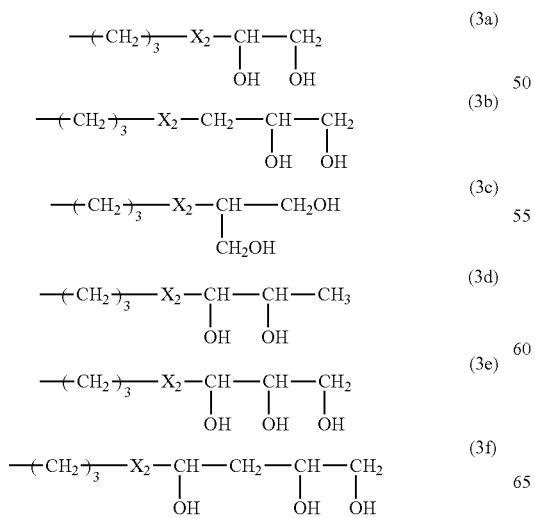
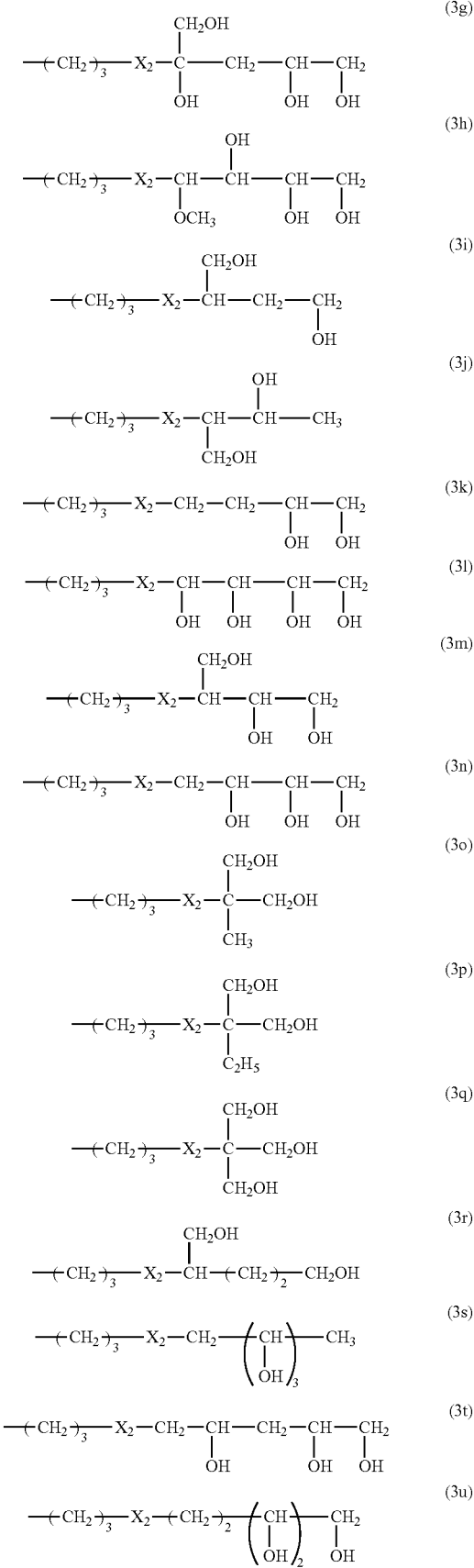

-continued

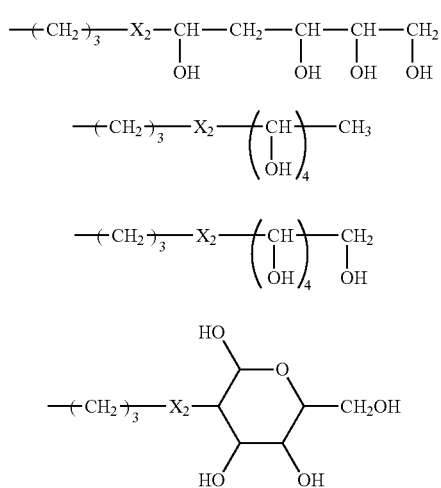
(3v)
(3w)
(3x)
(3y)

in which $X_2$ is an amide linkage of

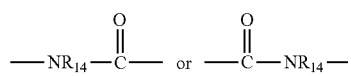

in which $R_{14}$ is hydrogen or $C_1$-$C_{10}$ alkyl.

9. The polydiorganosiloxane vinylic crosslinker according to any one of inventions 2 to 4, wherein $R_4$ is a monovalent radical of formula (4).

10. The polydiorganosiloxane vinylic crosslinker according to invention 9, wherein $R_4$ is a monovalent radical of formula (4a) or (4b)

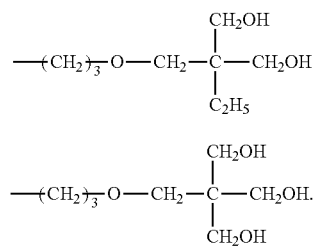
(4a)
(4b)

11. The polydiorganosiloxane vinylic crosslinker according to any one of inventions 2 to 4, wherein $R_4$ is a monovalent radical of formula (5).

12. The polydiorganosiloxane vinylic crosslinker according to invention 11, wherein $R_4$ is a monovalent radical of any one of formula (5a) to (5c)

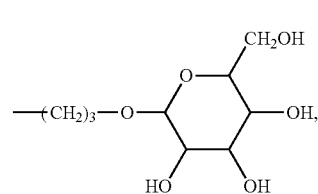
(5a)

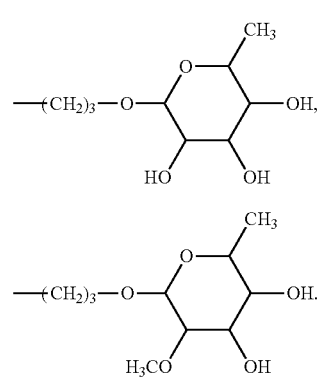
(5b)
(5c)

13. The polydiorganosiloxane vinylic crosslinker according to any one of inventions 2 to 4, wherein $R_4$ is a monovalent radical of formula (6).

14. The polydiorganosiloxane vinylic crosslinker according to invention 13, wherein in formula (6) n1 is 3 and q1 is 1.

15. The polydiorganosiloxane vinylic crosslinker according to any one of inventions 2 to 11, wherein in formula (1) $X_0$ is O.

16. The polydiorganosiloxane vinylic crosslinker according to any one of inventions 2 to 11, wherein in formula (1) $X_0$ is NR' in which R' is hydrogen or $C_1$-$C_{10}$-alkyl.

17. The polydiorganosiloxane vinylic crosslinker according to any one of inventions 1 to 16, wherein the polydiorganosiloxane vinylic crosslinker has a number average molecular weight of from about 4000 Daltons to about 50,000 Dalton.

18. The polydiorganosiloxane vinylic crosslinker according to any one of inventions 1 to 16, wherein the polydiorganosiloxane vinylic crosslinker has a number average molecular weight of from about 5000 Daltons to about 25,000 Daltons.

19. The polydiorganosiloxane vinylic crosslinker according to any one of inventions 1 to 16, wherein the polydiorganosiloxane vinylic crosslinker has a number average molecular weight of from about 6000 Daltons to about 18,000 Daltons.

20. A silicone hydrogel contact lens comprising a crosslinked polymeric material which comprises:
 units of a polydiorganosiloxane vinylic crosslinker according to any one of inventions 1 to 19;
 units of a siloxane-containing vinylic monomer;
 units of at least one hydrophilic vinylic monomer,
 wherein the silicone hydrogel contact lens, when being fully hydrated, has an oxygen permeability (Dk) of at least about 70 barrers, a water content of from about 25% to about 70% by weight, and an elastic modulus of from about 0.2 MPa to about 1.2 MPa.

21. The silicone hydrogel contact lens of invention 20, wherein the silicone hydrogel contact lens has a thermal stability as characterized by having an autoclave-induced change $$\left| \frac{LP_{19AC} - LP_{1AC}}{LP_{1AC}} \right|$$

of about 10% or less in at least one lens property (LP) selected from the group consisting of elastic modulus, water content, lens diameter, and combinations thereof, wherein $\overline{LP_{1AC}}$ is the averaged value of the lens property after one-autoclave and is obtained by averaging the values of the lens property of 15 soft contact lenses measured after being autoclaved one sole time for 30 minutes at 121° C. in a phosphate buffered saline at a pH of 7.2±0.2 and $\overline{LP_{18AC}}$ is the averaged values of the lens property after 19-autoclaves and is obtained by averaging the values of the les properties of 15 soft contact lenses measured after being stored and autoclaved 19 times each for 30 minutes at 121° C. in a phosphate buffered saline at a pH of 7.2±0.2.

22. The silicone hydrogel contact lens according to invention 20 or 21, wherein the hydrophilic vinylic monomer is N-vinylpyrrolidone, N,N-dimethyl (meth)acrylamide, (meth)acrylamide, N-hydroxyethyl (meth)acrylamide, N-hydroxypropyl (meth)acrylamide, hydroxyethyl (meth)acrylate, glycerol methacrylate (GMA), polyethylene glycol (meth)acrylate having a number average molecular weight of up to 1500, polyethylene glycol $C_1$-$C_4$-alkyl ether (meth)acrylate having a number average molecular weight of up to 1500, N-[tris(hydroxymethyl)methyl]-acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, or combinations thereof.

23. The silicone hydrogel contact lens according to invention 22, wherein the hydrophilic vinylic monomer is N-vinylpyrrolidone, N-vinyl-N-methyl acetamide, or combinations thereof.

24. The silicone hydrogel contact lens according to any one of inventions 20 to 23, wherein the crosslinked polymeric material further comprises units of a hydrophobic vinylic monomer free of silicone, units of a non-silicone vinylic crosslinker, units of a UV-absorbing vinylic monomer, or a combination thereof.

25. The silicone hydrogel contact lens according to any one of inventions 20 to 24, wherein the silicone hydrogel contact lens comprises from about 30% to about 60% by weight of the units of said at least one hydrophilic vinylic monomer, wherein the weight percentage of the units of said at least one hydrophilic vinylic monomer is the weight percentage of said at least one hydrophilic vinylic monomer relative to the total weight of all polymerizable components in a polymerizable composition for making the crosslinked polymeric material.

26. A method for producing silicone hydrogel contact lenses, comprising the steps of:
preparing a lens-forming composition which is clear at room temperature and optionally but preferably at a temperature of from about 0 to about 4° C., wherein the lens-forming composition comprises (a) from about 5% to about 35% by weight of a polydiorganosiloxane vinylic crosslinker of any one of claims 1 to 19, (b) a siloxane-containing vinylic monomer, (c) from about 30% to about 60% by weight of at least one hydrophilic vinylic monomer, (d) at least one free-radical initiator, provided that the above-listed polymerizable components and any additional polymerizable components add up to 100% by weight;
introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and
curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, and an elastic modulus of from about 0.2 MPa to about 1.2 MPa, 27. The method of invention 26, wherein the silicone hydrogel contact lens has a thermal stability as characterized by having an autoclave-induced change $$\left| \frac{LP_{19AC} - LP_{1AC}}{LP_{1AC}} \right|$$

of about 10% or less in at least one lens property (LP) selected from the group consisting of elastic modulus, water content, lens diameter, and combinations thereof, wherein $\overline{LP_{1AC}}$ is the averaged value of the lens property after one-autoclave and is obtained by averaging the values of the lens property of 15 soft contact lenses measured after being autoclaved one sole time for 30 minutes at 121° C. in a phosphate buffered saline at a pH of 7.2±0.2 and $\overline{LP_{19AC}}$ is the averaged values of the lens property after 19-autoclaves and is obtained by averaging the values of the les properties of 15 soft contact lenses measured after being stored and autoclaved 19 times each for 30 minutes at 121° C. in a phosphate buffered saline at a pH of 7.2±0.2.

28. The method according to invention 26 or 27, wherein the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof (preferably, the blending vinylic monomer is methylmethacrylate).

29. The method according to invention 26 or 27, wherein the lens-forming composition comprises an organic solvent (preferably selected from the group consisting of 1-propanol, isopropanol, tert-amyl alcohol, 1,2-propylene glycol, a polyethyleneglycol having a molecular weight of about 400 Daltons or less, or a mixture thereof).

30. The method according to any one of inventions 26 to 29, wherein the total amount of all silicone-containing polymerizable components present in the lens-forming composition is about 65% or less.

31. The method according to any one of inventions 26 to 30, wherein the hydrophilic vinylic monomer is a hydrophilic N-vinyl monomer, preferably is N-vinylpyrrolidone, N-vinyl-N-methyl acetamide, N-vinyl formamide, N-vinyl acetamide, N-vinyl isopropylamide, or combinations thereof, even more preferably is N-vinylpyrrolidone, N-vinyl-N-methyl acetamide, or combinations thereof.

32. The method according to any one of inventions 26 to 31, wherein the lens-forming composition further comprises a non-silicone vinylic crosslinker.

33. The method according to invention 32, wherein the non-silicone vinylic crosslinker is selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di- (meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), vinyl methacrylate, allylmethacrylate, allylacrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, combinations thereof (preferably selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth) acrylate, glycerol dimethacrylate, allyl (meth)acrylate, N,N'-methylene bis(meth)acrylamide, N,N'-ethylene bis(meth)acrylamide, N,N'-dihydroxyethylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), triallyl isocyanurate, tetraethyleneglycol divinyl ether, triethyleneglycol divinyl ether, diethyleneglycol divinyl ether, ethyleneglycol divinyl ether, and combinations thereof).

34. The method according to any one of inventions 26 to 33, wherein the siloxane-containing vinylic monomer is 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloxy-terminated polydimethylsiloxanes of various molecular weight, mono-(meth)acrylamido-terminated polydimethylsiloxanes of various molecular weight, or a combination thereof.

35. The method according to any one of inventions 26 to 34, wherein the step of curing is carried out thermally.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

The following abbreviations are used in the following examples: MCR-M07 represents monobutyl-terminated monomethacryloxypropyl-terminated polydimethylsiloxane (M.W. 600 to 800 g/mol from Gelest); NVP represents N-vinylpyrrolidone; DMA represents N,N-dimethylacrylamide; VMA represents N-vinyl-N-methyl acetamide; N—CH$_3$ BisAm represents N-methyl-N-bis(trimethylsiloxy)methylsilylpropyl acrylamide (or 3-N-methyl (meth)acrylamidopropylbis(trimethylsiloxy) methylsilane); SIGMA represents 3-(3-methacryloxy-2-hydroxypropyloxypropyl-bis(trimethylsiloxy)methylsilane; MMA represents methyl methacrylate; TEGDMA represent triethyleneglycol dimethacrylate; TEGDVE represents triethyleneglycol divinyl ether; EGMA represents ethylene glycol methyl ether methacrylate; AMA represents allyl methacrylate; VAZO 64 represents 2,2'-dimethyl-2,2'azodipropiononitrile; Nobloc is 2-[3-(2H-Benzotriazol-2-yl)-4-hydroxyphenyl]ethyl methacrylate from Aldrich; RB246 is Reactive Blue 246 from Arran; 1-PrOH represents 1-propanol; IPA represents isopropanol; DC 1173 represents Darocur 1173® photoinitiator; MeCN represents acetonitrile;

EXAMPLE 1

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Ion Permeability Measurements

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Autoclave

The autoclave is done at 121° C. Each cycle of autoclave takes 30 minutes. 15 lenses are subject to 1 cycle of autoclave. 15 lenses are subjected to 7 cycles of autoclave. 15 lenses are subjected to 13 cycles of autoclave. 15 lenses are subjected to 19 cycles of autoclave. Those lenses subjected to n-cycles of autoclave treatments are used for lens property characterization to assess lens thermal stability.

Lubricity Evaluation

The lubricity of a lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

Surface Wettability Tests

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Massachusetts. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18 MΩcm and the droplet volume used is 2 µl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests

The surface hydrophilicity of lenses (after autoclave) is assessed by determining the time required for the water film to start breaking on the lens surface. Briefly, lenses are removed from the vial and placed in PBS (phosphate buffered saline) for at least two rinses of 30 minutes each and then transferred to fresh PBS in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from PBS and are assigned a WBUT of 0 seconds. Lenses exhibiting WBUT≥10 seconds are considered to have a hydrophilic surface and are expected to exhibit adequate wettability (ability to support the tear film) on-eye.

Digital Rubbing Tests

The lenses are digitally rubbed (wearing disposable powder-free latex gloves) with PBS or RENU® multi-purpose lens care solution (or another multi-purpose lens care solution) for 20 seconds and then rinsed with saline. The above procedure is repeated for a given times, e.g., from 1 to 30 times, (i.e., number of repetitions of digital rubbing tests which imitate cleaning and soaking cycles).

Coating Intactness Tests

The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in the mixture ~80% mineral oil and ~20% vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated. Visible fine lines on lens surface may indicate the presence of cracking of the crosslinked coatings.

Lens Surface Cracking Test

Excessive crosslinking of a coating layer can lead to surface cracks visible under a darkfield microscope after rubbing a lens. The lens surface cracking test is used to differentiate the severity of surface cracking resulting from exposure of a lens to conditions and forces that could be encountered during routine and intended use of lenses.

Invert the lens confirmation by holding the edge of the lens between the thumb and index finger of one hand. The concave side of the lens should face the experimenter's body. With the thumb and/or index finger of the other hand, gently bend the top of the lens over the index finger holding the lens until the lens confirmation inverts. Look for surface cracks at 5× to 10× magnification under the darkfield stereomicroscope. If individual crack lines are clearly distinguishable, then the lenses are considered "yes" for cracking If the lens appears to have long, cloudy, linear formations, but crack lines are not distinguishable, then these area maybe inspected at higher magnification as needed. If no crack lines or long, cloudy, linear formations are visible, then the lens are considered "no" cracking. Lenses exhibiting no cracking 0 are considered better and are expected to exhibit smooth and soft surface.

Lens Surface Bead Test

The lens surface bead test is used to evaluate surface charges of contact lenses. The data generated from this method are the numbers of beads that are absorbed onto lens surface, and serve as an informational tool indicating the surface charge property.

The beads of Dovex 1×4 chloride form 50-100 mesh (Lot #54898PJV Sigma Aldrich CAS69011-19-4) are suspended in PBS. The lens is soaked in bead/PBS in a centrifuge tube. After on shaker at 300 rpm for 2 min, the lens is rinsed using PBS. The beads absorbed on lens surface are then observed under the dark field microscope. Image Pro software is used to analyze the total count number of cationic beads. The total for cationic beads is the total count number of the bead test.

EXAMPLE 2

Synthesis of Glycerol Ether Containing PDMS Macromer (Macromer A)

Macromer A is prepared according to the procedures shown in Scheme 1 overnight. After filtration, the solvent is removed via Rotovap, followed by high vacuum. 102 g of final product (the precursor) is obtained.

Hydrosilylation Reaction with 3-Allyloxy-1,2-Propanediol to Form Macromer a

A small reactor is connected to a heater and air condenser with drying tube. 21 g of toluene, 15 g of above precursor, and 5.03 g of 3-allyloxy-1,2-propanediol are added to the reactor. After the solution temperature is stabilized at 30° C.,

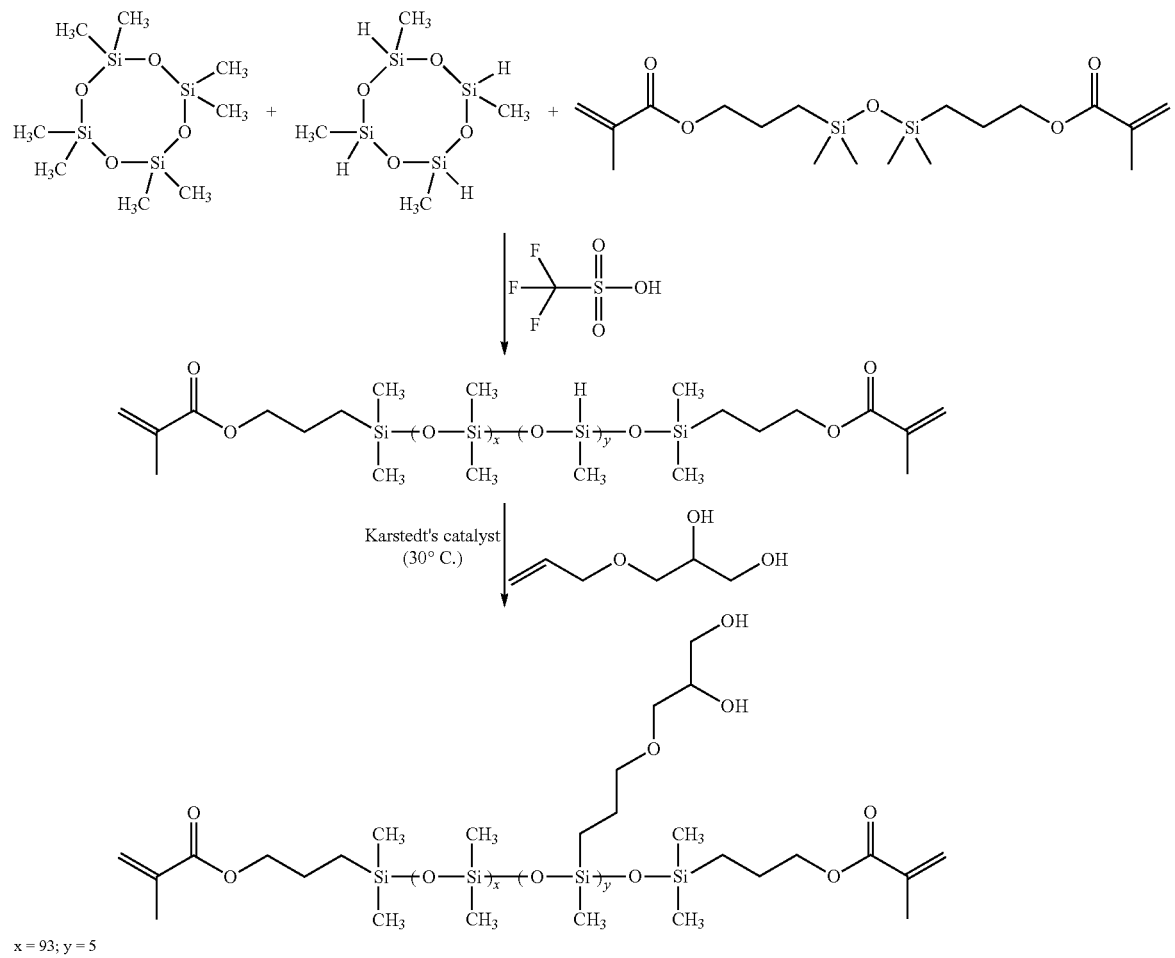

Scheme 1 x = 93; y = 5

Synthesis of the Precursor 275.9 g of octamethylcyclotetrasiloxane (M.W. 296.62), 12.0 g of 1,3,5,7-tetramethylcyclotetrasiloxane (M.W. 240.51), 9.7 g of 1,3-bis(3-methacryloxypropyl) tetramethyldisiloxane (M.W. 386.63), and 0.9 g of trifluoromethanesulfonic acid (M.W. 150.08) are weighed into a 500 mL round bottom flask. After the reaction is run at 35° C. for 24 h, 170 mL of 0.5% sodium hydrogen carbonate is added. The collected organic portion is further extracted five times with de-ionized water (170 mL per cycle). Anhydrous $MgSO_4$ is added to the collected organic solution, followed by ~350 mL of additional $CHCl_3$, and the solution is then stirred 152 μL of Karstedt's catalyst (2 Pt % in xylene) is added. After 2 h, the conversion of Si—H of 100% based on IR is achieved. The solution is then transferred to a flask, concentrated using Rotovop, followed by precipitation in actenotrile/water mixture (75/25) three times. After removal of solvent via Rotovop, followed by high vacuum, 12 g of hazy liquid is obtained.

EXAMPLE 3

Synthesis of Glycerol Ether Containing PDMS Macromer (Macromer B)

Macromer B is prepared according to the procedures similar to what described in Example 2, except that the amount of tetramethylcyclotetrasiloxane in the first step for preparing precursor is approximately doubled. The obtained Macromer B has a structure formula control macromer (10 parts); MCS-M11 (20 parts); NVP (58 parts); MMA (10 parts); TEGDVE (0.1 part); TEGDMA (0.5 part); Vazo 64 (0.8 part); and Norbloc (0.9 part).

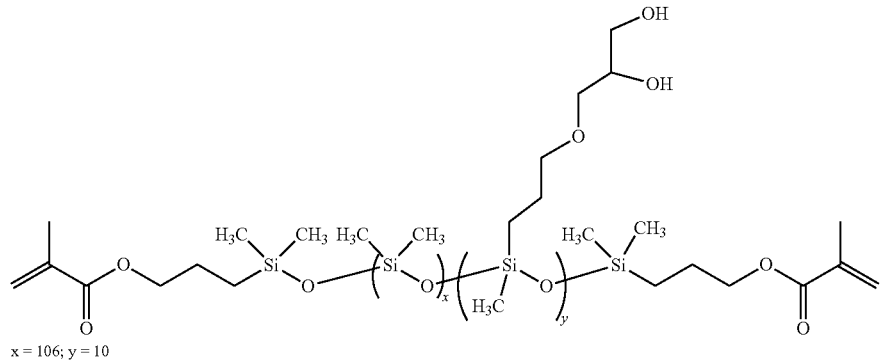

x = 106; y = 10

EXAMPLE 4

Compatibility of Macromers with Hydrophilic Vinylic Monomers

Macromer A, prepared in Example 2, are used in preparing various lens formulations including from about 38% to about 58% by weight of at least one hydrophilic vinylic monomer (DMA and/or NVP), to assess their compatibility with relatively-high amount of hydrophilic vinylic monomers. As control experiments, α,ω-dimethacryloxyethoxypropyl-terminated polydimethylsiloxane (M.W. 4,500 g/mol) is used also as a macromer to prepare lens formulations in the compatibility studies. Tables 1 and 2 show the compositions of the lens formulations. All lens formulations prepared from hydrophilized polydisiloxane crosslinker (macromer), Macromer A, are homogeneous (clear), whereas all the lens formulations prepared from unhydrophilized polydisiloxane crosslinker (macromer), α,ω-dimethacryloxyethoxypropyl-terminated polydimethylsiloxane, are inhomogeneous (cloudy).

TABLE 1

| Formulation No. | Composition (parts) | | | | | | |
|---|---|---|---|---|---|---|---|
| | 1 | 2 | 3 | 4 | 5 | 6 | 7 |
| Macromer | 25 | 35 | 30 | 30 | 28 | 25 | 25 |
| N—CH$_3$ BisAm | 31 | 26 | 26 | 31 | 29 | 36 | 26 |
| DMA | 43 | 38 | 43 | 38 | 41 | 38 | 48 |

TABLE 2

| Formulation No. | Composition (parts) | | | |
|---|---|---|---|---|
| | 8 | 9 | 10 | 11 |
| Macromer | 18 | 6 | 6 | 10 |
| MCR-M07 | 10.5 | 22.5 | 10.5 | 14.50 |
| SIGMA | 9 | 9 | 21 | 13 |
| MMA | 10 | 10 | 10 | 10 |
| DMA | 2 | 2 | 2 | 2 |
| NVP | 49.4 | 49.4 | 49.4 | 49.4 |

Macromer A, Macromer B and control macromer (α,ω-dimethacryloxyethoxypropyl-terminated polydimethylsiloxane) are used to prepare three formulations with the following compositions: Macromer A or Macromer B or It is found that the formulation including control macromer is inhomogeneous (cloudy) both at room temperature and at refrigerate temperature (2-4° C.); the formulation including Macromer A is homogeneous (clear) at room temperature but inhomogeneous (cloudy) at refrigerate temperature (2-4° C.); the formulation including Macromer B is homogeneous both at room temperature and at refrigerate temperature (2-4° C.). These results indicate that the higher content of hydrophilic substituents (glycerol ether pendant chains) in a macromer can improve the capability of the macromer with hydrophilic vinylic monomers.

EXAMPLE 5

Two lens formulations are prepared to have the following composition: Macromer A or B prepared in Example 2 (31.80%); N—CH$_3$ Bis Am (20.71%); DMA (23.24%); DC 1173 (1.01%); and 1-PrOH (23.21%). A prepared lens formulation is introduced into polypropylene lens molds and cured by UV irradiation to form contact lenses. Lenses are tested for properties according to the procedures described in Example 1. The properties (elastic modulus, E'; corrected oxygen permeability, Dkc; ion permeability, IP, related to alsacon; water content) of resultant lenses are reported in Table 3.

TABLE 3

| Lens properties | Lenses from Macromer A | Lenses from Macromer B |
|---|---|---|
| Modulus, E' (MPa) | 0.43 | 0.27 |
| Dkc (barrers) | 184 | 170 |
| IP | 3.5 | 2.5 |
| WC % | 29 | 29 |

Table 3 shows that when the molar ratio y/x, of the hydrophilized siloxane units over dimethylsiloxane units in the used polydiorganosiloxane vinylic crosslinker increases from about 0.054 (Macromer A) to about 0.094 (Macromer B), the oxygen permeability of resultant lenses decreases from about 184 Barrers to about 170 Barrers.

Lenses, made from both Macromer A and B, are tested for thermal stability as characterized by autoclave-induced change in lens properties (E', WC %, and $D_{lens}$). Table 4 shows that no significant autoclave-induced change in lens properties is observed for all the lenses made from Macromer A or B even after being subjected to 1, 7, 13, and 19-cycles of autoclave treatments respectively, i.e., having a good thermal stability.

TABLE 4

|  | Lenses from Macromer A | | | Lenses from Macromer B | | |
| --- | --- | --- | --- | --- | --- | --- |
|  | E' (MPa) | WC % | $D_{lens}$ (mm) | E' (MPa) | WC % | $D_{lens}$ (mm) |
| AC (x1) | 0.43 ± 0.04 | 29.1 ± 0.4 | 14.49 ± 0.07 | 0.27 ± 0.02 | 28.8 ± 0.4 | 14.33 ± 0.09 |
| AC (x7) | NA | NA | NA | 0.24 ± 0.01 | 29.2 ± 0.4 | 14.32 ± 0.16 |
| AC (x13) | 0.40 ± 0.01 | 29.8 ± 0.4 | 14.48 ± 0.05 | 0.23 ± 0.02 | 29.3 ± 0.5 | 14.35 ± 0.28 |
| AC (x19) | 0.41 ± 0.01 | 29.8 ± 0.3 | 14.61 ± 0.05 | 0.25 | 29.5 ± 0.7 | 14.28 ± 0.12 |

EXAMPLE 6

Synthesis of the Precursor 1935.04 g of Octamethylcyclotetrasiloxane (D4), 158.74 g of 1,3,5,7-tetramethyl-cyclotetrasiloxane (D4H) and 106.33 g of 1,3-BIS(3-methacryloxypropyl)tetramethyldisiloxane are weighted and premixed in a flask and then charged to a 4-L jacked reactor equipped with a mechanical motor, thermo couple and $N_2$ flow. After 4.4 g of triflic Acid is spiked to the reaction flask. The reaction is then performed at 25° C. for about 14 hours. After the reaction is completed, the solution is diluted with 1000 mL of toluene and then neutralized by a solid base follow with one hour of stir. The final mixture is filtered with 0.45 micron Glass Microfiber Filter and then concentrated on rotavap and then under low vacuum to remove the residual solvent in the presence of 400-500 ppm of inhibitor. The resultant precursor is not purified and determined to have a number average molecular weight of about 8K g/mol., an averaged x of about 92.6 (by NMR), and an averaged y of about 9.2 (by NMR).

catalyst solution is injected therein. The reaction mixture is stirred at 75° C. for about one hour. The reaction mixture is then cooled down to room temperature and transferred to a separatory funnel for carrying out extractions to remove extra 3-allyloxy-1,2-propanediol starting materials. The crude product after reaction is then extracted as following: first with 1.5 L of a mixture of acetonitrile/water (9/1 v/v) for 42 hours and then with 1000 g of a mixture of tetrahydrofuran (THF)/MeCN/wter (450/350/200 w/w/w) for 24 hours for three times. The weight of the product after extraction is about 907.2 g.

After extraction, the silicone phase is stabilized with 100 mg (~200 ppm) of phenothiazine (PTZ) inhibitor in 10 mL of toluene. The solvent is removed on rotary evaporator at 35° C. The weight of product at this time is about 537.0 g. The product is diluted with 1000 g of toluene and filtered with glass fiber filter covered by celite. After concentration on rotary evaporator at 35° C., the weight of product is about 473.6 g. The product is diluted again with 1000 g of toluene, and then filtered with 0.45 μm membrane. After concentra-

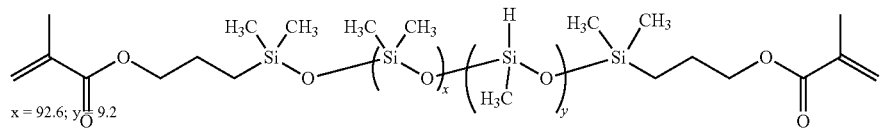

Synthesis of the Glycerol Ether Containing PDMS Macromer

A 4 L jacket reactor is warmed up to 75° C. and purged with nitrogen for 0.5 h. 3-allyloxy-1,2-propanediol (ca. 780.4 g, i.e., in a molar ratio of 5:1 over hydrosiloxane unit) the precursor prepared above (ca. 999.5 g), potassium acetate (ca. 2.5 g) and isopropanol (ca. 1.2 L) are added therein. The mixture is stirred for about 20 minutes. About 1.6 mL (ca. 30 ppm related to the precursor) of Karstedt's tion on rotary evaporator at 35° C., the weight of product is about 476.5 g. 100 mg (~200 ppm) of 2,6-di-tert-butyl-4-methylphenol (BHT) and 100 mg (~200 ppm) of 4-methoxyphenol (MEHQ) in 1.0 mL of toluene are added to stabilize the product. The product is dried under high vacuum at r.t. for 3 h. (Weight=458.62 g), and then at 60° C. for 3 h. The weight of final macromer is about 432.6 g. Yield: 74.7% based on half of silicone precursor. The solid content of macromers is determined by weight loss under high vacuum at 50. Solid content: 96.1%. x=109.0, y=9.9 (by NMR).

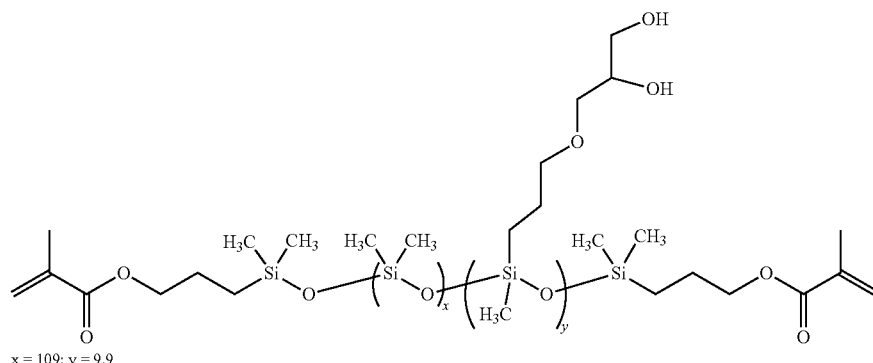

EXAMPLE 7

Synthesis of the Precursor

D4 (1067.04 g), D4H (86.64 g) and 1,3-BIS(3-methacryloxypropyl)tetramethyldisiloxane (46.54 g) are weighted and premixed in a flask and then charged to a 4-L jacked reactor equipped with a mechanical motor, thermo couple and $N_2$ flow. After triflic Acid (2.4 g) is spiked to the reaction flask. The reaction is then performed at 25° C. for 14 hours. After the reaction is completed, the solution is diluted with 1000 mL of toluene and then neutralized by a solid base follow with one hour of stir. The final mixture is filtered with 0.45 micron Glass Microfiber Filter and then concentrated on rotavap and then under low vacuum to remove the residual solvent in the presence of 400-500 ppm of inhibitor. The resultant precursor is not purified and determined to have a number average molecular weight of about 8K g/mol., an averaged x of about 99.6 (by NMR), and an averaged y of about 9.4 (by NMR).

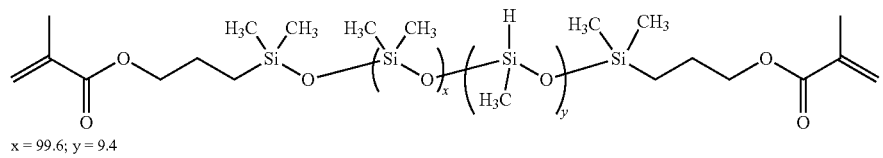

x = 99.6; y = 9.4

Synthesis of the Glycerol Ether Containing PDMS Macromer

A 4 L jacket reactor is warmed up to 75° C. and purged with nitrogen for 0.5 h. 3-allyloxy-1,2-propanediol (ca. 837.9 g, i.e., in a molar ratio of 5:1 over hydrosiloxane unit), the precursor prepared above (ca. 1075.1 g), potassium acetate (ca. 1.8 g) and isopropanol (ca. 0.9 L) are added therein. The mixture is stirred for about 20 minutes. About 1.6 mL (ca. 30 ppm related to the precursor) of Karstedt's catalyst solution is injected therein. The reaction mixture is stirred at 75° C. for about one hour. The reaction mixture is then cooled down to room temperature and transferred to a separatory funnel for carrying out extractions to remove extra 3-allyloxy-1,2-propanediol starting materials. The crude product after reaction is then extracted as following: first with 3.0 L of a mixture of acetonitrile/water (9/1 v/v) for 24 hours, with 2.0 L of a mixture of THF/MeCN/water (450/350/200 w/w/w) for 24 hours for two times, and finally with 2.0 L of a mixture of THF/MeCN/water (450/350/200 w/w/w) for 66 hours. The weight of the product after extraction is about 1225.41 g.

The crude product is diluted with 2450 g of toluene and stabilized by 245.1 mg of BHT and 245.3 mg of MEHQ inhibitors. The solution is filtered with glass fiber filter covered by celite. After removal solvent on rotary evaporator, the weight of product is about 1086.4 g. The product is diluted with 2000 g of toluene, and then filtered again through 0.45 μm membrane. After removal solvent on rotary evaporator at 35° C., the weight is about 1089.2 g. The product is dried under high vacuum at room temperature for 20 h (Weight=1064.08 g), and then at 80° C. for 3 h. The final weight of the macromer is about 1049.9 g (theoretical: 846.12 g). Yield: 84.3%. The solid content of macromers is determined by weight loss under high vacuum at 50° C. for 24 h. Solid content: 98.0%. x=122.5, y=11.0 (by NMR).

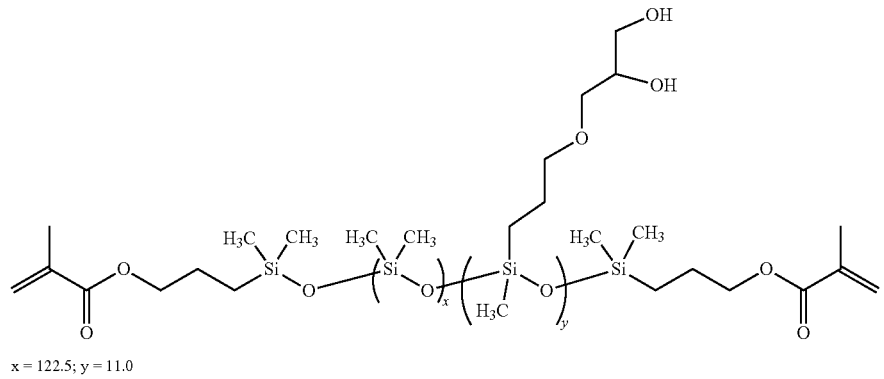

x = 122.5; y = 11.0

EXAMPLE 8

A lens formulation is prepared to have the following composition: Macromer A prepared in Example 2 (10 parts); MCR-M07 (30 parts); MMA (10 parts); VMA (50 parts); TEGDMA (0.2 parts); and Vazo 64 (0.5 parts). The prepared lens formulation is homogeneous (clear) both at room temperature and at refrigerate temperature (2-4° C.), indicating Macromer A is compatible with VMA at least up to about 50% by weight.

Lenses which are cast-molded (thermally) in polypropylene molds have the following properties: elastic modulus (0.52±0.01 MPa); elongation at break (245±128%); tensile strength (0.88±0.52 MPa); oxygen permeability (DKc=124.5±11 barrers).

EXAMPLE 9

IPC Saline

IPC saline is prepared by mixing about 0.07% by weight of Poly(AAm-co-AA) [poly(acrylamide-co-acrylic acid)] with about 0.35% by weight of PAE (polyamidoamine-ephichlorohydrin) in phosphate buffered saline and pre-treated at certain temperature for a desired time. Poly(AAm-co-AA)(90/10) partial sodium salt, poly(AAm-co-AA) 90/10, Mw 200,000) is purchased from Polysciences, Inc. and used as received. After the heat pre-treatment, the IPC saline is filtered using a 0.22 micron membrane filter and cooled down back to room temperature. 5 ppm hydrogen peroxide maybe added to the final IPC saline to prevent bioburden growth and the IPC saline is filtered using a 0.22 micron membrane filter.

Preparation of SiHy Lenses

A lens formulation is prepared by adding Macromer A prepared in Example 2 (6 parts), AMA (0.1 part), TEGDMA (0.2 part), MMA (10 parts), EGMA (10 parts), NVP (40 parts), MCR-M07 (34 parts), Norbloc (0.9 part), RB246 (0.01 part) and VAZO 64 (0.5 part) into a clean bottle, with a stir bar to mix at 600 rpm for 30 min at room temperature. After all the solid is dissolved, a filtration of the formulation is carried out by using 2.7 um GMF filter.

The lens formulation prepared above is purged with nitrogen at room temperature for 30 to 35 minutes. The $N_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes. The molds are opened and the molded lenses are removed from the molds.

After demolding, silicone hydrogel contact lenses are subjected to a 3-step coating process to form PAA coatings (i.e., base coatings) on the silicone hydrogel contact lenses as follows. Silicone hydrogel contact lenses are first immersed in phosphate buffered saline (PBS, ca. 0.044 w/w % $NaH_2PO_4 \cdot H_2O$, ca. 0.388 w/w % $Na_2HPO_4 \cdot 2H_2O$, and ca. 0.79 w/w % NaCl) for about 60 minutes at room temperature, second immersed in the PAA solution (ca. 0.5% by weight of polyacrylic acid (Mw 250000), pH 2.0) for about 60 minutes at room temperature, and third rinsed with PBS for about 5 minutes at room temperature.

SiHy lenses having a PAA base coating thereon prepared above are placed in polypropylene lens packaging shells (or blisters) (one lens per shell) with 0.6 mL of the IPC saline (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

The resultant SiHy lenses have an oxygen permeability (measured according to polarographic method) of about 83 barrers, a bulk elastic modulus of about 0.67 MPa, a water content of about 50% by weight, a relative ion permeability of about 11.0 relative to Alsacon lens, and a water contact angle of 29 degrees, a WBUT of 14 seconds. Some cracking lines are visible after rubbing the test lens and stained with Sudan Black. However, the lenses are very lubricious in a finger rubbing test and having a friction rating of about 0.5. When the lenses are tested for lens surface charge according to the Positively Charged Particles Adhesion test, there are less than 71 positively-charged particles (DOWEX™ monosphere ion exchange resins) which are adhered onto lenses with the crosslinked coating.

What is claimed is:

1. A silicone hydrogel contact lens comprising a crosslinked polymeric material which comprises units of a polydiorganosiloxane vinylic crosslinker of formula (1)

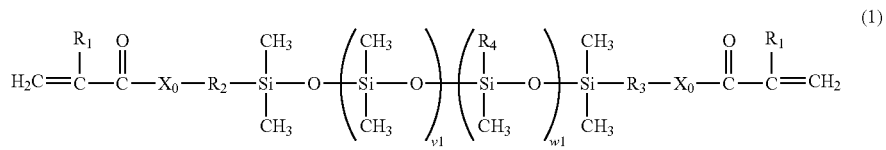

in which:
- υ1 is an integer of from 30 to 500 and ω1 is an integer of from 1 to 75, provided that ω1/υ1 is from about 0.035 to about 0.15;
- $X_0$ is O or NR' in which R' is hydrogen or $C_1$-$C_{10}$-alkyl;
- $R_1$ is hydrogen or methyl;
- $R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;
- $R_4$ is a monovalent radical of formula (2)

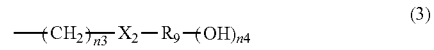

- n3 is an integer of 3 to 6;
- n4 is an integer of 2 to 5;

$R_9$ is a $C_2$-$C_6$ hydrocarbon radical having (n4+1) valencies; and $X_2$ is an amide linkage of $$-NR_{14}-\overset{O}{\underset{\|}{C}}- \quad \text{or} \quad -\overset{O}{\underset{\|}{C}}-NR_{14}-$$

in which $R_{14}$ is hydrogen or $C_1$-$C_{10}$ alkyl, wherein the polydiorganosiloxane vinylic crosslinker has a number average molecular weight of from about 3000 Daltons to about 80,000 Daltons.

2. The silicone hydrogel contact lens of claim 1, wherein in formula (1) $X_0$ is O.

3. The silicone hydrogel contact lens of claim 2, wherein in formula (1) ω1/υ1 is from about 0.040 to about 0.12.

4. The silicone hydrogel contact lens of claim 3, wherein $R_4$ is a monovalent radical of any one of formula (3a) to (3y)

(3a) $-(CH_2)_3-X_2-CH(OH)-CH_2(OH)$ (3b) $-(CH_2)_3-X_2-CH_2-CH(OH)-CH_2(OH)$ (3c) $-(CH_2)_3-X_2-CH(OH)-CH_2OH$ with $CH_2OH$ branch (3d) $-(CH_2)_3-X_2-CH(OH)-CH(OH)-CH_3$ (3e) $-(CH_2)_3-X_2-CH(OH)-CH(OH)-CH_2(OH)$ (3f) $-(CH_2)_3-X_2-CH(OH)-CH_2-CH(OH)-CH_2(OH)$ (3g) $-(CH_2)_3-X_2-C(CH_2OH)(OH)-CH_2-CH(OH)-CH_2(OH)$ (3h) $-(CH_2)_3-X_2-CH(OCH_3)-CH(OH)-CH(OH)-CH_2(OH)$ (3i) $-(CH_2)_3-X_2-CH(CH_2OH)-CH_2-CH_2(OH)$ (3j) $-(CH_2)_3-X_2-CH(OH)-CH(CH_2OH)-CH_3$ (3k) $-(CH_2)_3-X_2-CH_2-CH_2-CH(OH)-CH_2(OH)$ (3l) $-(CH_2)_3-X_2-CH(OH)-CH(OH)-CH(OH)-CH_2(OH)$ (3m) $-(CH_2)_3-X_2-CH(CH_2OH)-CH(OH)-CH_2(OH)$ (3n) $-(CH_2)_3-X_2-CH_2-CH(OH)-CH(OH)-CH_2(OH)$ (3o) $-(CH_2)_3-X_2-C(CH_2OH)(CH_3)-CH_2OH$ (3p) $-(CH_2)_3-X_2-C(CH_2OH)(C_2H_5)-CH_2OH$ (3q) $-(CH_2)_3-X_2-C(CH_2OH)(CH_2OH)-CH_2OH$ (3r) $-(CH_2)_3-X_2-CH(CH_2OH)-(CH_2)_2-CH_2OH$ (3s) $-(CH_2)_3-X_2-CH_2-(CH(OH))_3-CH_3$ (3t) $-(CH_2)_3-X_2-CH_2-CH(OH)-CH_2-CH(OH)-CH_2(OH)$ (3u) $-(CH_2)_3-X_2-(CH_2)_2-(CH(OH))_2-CH_2(OH)$ (3v) $-(CH_2)_3-X_2-CH(OH)-CH_2-CH(OH)-CH(OH)-CH_2(OH)$ (3w) $-(CH_2)_3-X_2-(CH(OH))_4-CH_3$ (3x) $-(CH_2)_3-X_2-(CH(OH))_4-CH_2(OH)$ (3y) pyranose ring: $-(CH_2)_3-X_2-$ attached to tetrahydropyran with HO, HO, OH, CH$_2$OH substituents in which $X_2$ is an amide linkage of $$-NR_{14}-\overset{O}{\underset{\|}{C}}- \quad \text{or} \quad -\overset{O}{\underset{\|}{C}}-NR_{14}-$$

in which $R_{14}$ is hydrogen or $C_1$-$C_{10}$ alkyl.

5. The silicone hydrogel contact lens of claim 3, wherein the crosslinked polymeric material comprises units of at least one hydrophilic vinylic monomer.

6. The silicone hydrogel contact lens of claim 5, wherein said at least one hydrophilic vinylic monomer is selected from the group consisting of N-vinylpyrrolidone, N,N-dimethyl (meth)acrylamide, (meth)acrylamide, N-hydroxyethyl (meth)acrylamide, N-hydroxypropyl (meth)acrylamide, hydroxyethyl (meth)acrylate, glycerol methacrylate (GMA), polyethylene glycol (meth)acrylate having a number average molecular weight of up to 1500, polyethylene glycol $C_1$-$C_4$-alkyl ether (meth)acrylate having a number average molecular weight of up to 1500, N-[tris(hydroxymethyl)methyl]-acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, and combinations thereof.

7. The silicone hydrogel contact lens of claim 5, wherein said at least one hydrophilic vinylic monomer is N-vinylpyrrolidone, N-vinyl-N-methyl acetamide, or combinations thereof.

8. The silicone hydrogel contact lens of claim 3, wherein the crosslinked polymeric material comprises units of a siloxane-containing vinylic monomer.

9. The silicone hydrogel contact lens of claim 8, wherein the siloxane-containing vinylic monomer is 3-acrylamidopropyl-bis(trimethylsiloxy)methylsilane, 3-N-methyl acrylamidopropylbis(trimethylsiloxy)methylsilane, N-[tris(trimethylsilyloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide, N-(2-hydroxy-3-(3-(bis(trimethylsilyloxy)methylsilyl)propyloxy)propyl) acrylamide, N,N-bis[2-hydroxy-3-(3-(bis(trimethylsilyloxy)methylsilyl)propyloxy)propyl]-2-methyl acrylamide, N,N-bis[2-hydroxy-3-(3-(bis(trimethylsilyloxy)methylsilyl)propyloxy)propyl] acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl)acrylamide, N,N-bis[2-hydroxy-3-(3-(tris(trimethylsilyloxy)silyl)propyloxy)propyl]-2-methyl acrylamide, N,N-bis[2-hydroxy-3-(3-(tris(trimethylsilyloxy)silyl)propyloxy)propyl]acrylamide, N-[2-hydroxy-3-(3-(t-butyldimethylsilyl)propyloxy)propyl]-2-methyl acrylamide, N-[2-hydroxy-3-(3-(t-butyldimethylsilyl)propyloxy)propyl]acrylamide, N,N-bis[2-hydroxy-3-(3-(t-butyldimethylsilyl)propyloxy)propyl]-2-methyl acrylamide, N,N-bis[2-hydroxy-3-(3-(t-butyldimethylsilyl)propyloxy)propyl]acrylamide, 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxyethoxypropyloxy-propyl-bis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, or combinations thereof.

10. The silicone hydrogel contact lens of claim 8, wherein the siloxane-containing vinylic monomer is a polycarbosiloxane vinylic monomer.

11. The silicone hydrogel contact lens of claim 8, wherein the siloxane-containing vinylic monomer is a polydimethylsiloxane-containing vinylic monomer.

12. The silicone hydrogel contact lens of claim 11, wherein the polydimethylsiloxane-containing vinylic monomer is 3-(meth)acryloxy-2-hydroxypropyloxy)propyl-bis(trimethylsiloxy)methylsilane, 3-(meth)acryloxyethoxypropyloxypropyl-bis(trimethylsiloxy)methylsilane, 3-(meth)acrylamidopropyl-bis(trimethylsiloxy)-methylsilane, 3-N-methyl (meth)acrylamidopropylbis(trimethylsiloxy)methylsilane, a mono-(meth)acryloxy-terminated polydimethylsiloxane, or a mono-(meth)acrylamido-terminated polydimethylsiloxane.

13. The silicone hydrogel contact lens of claim 11, wherein the polydimethylsiloxane-containing vinylic monomer is mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane.

14. The silicone hydrogel contact lens of claim 8, wherein the crosslinked polymeric material comprises units of a hydrophobic vinylic monomer free of silicone.

15. The silicone hydrogel contact lens of claim 14, wherein the hydrophobic vinylic monomer free of silicone is methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, or hexafluorobutyl methacrylate.

16. The silicone hydrogel contact lens of claim 14, wherein the crosslinked polymeric material comprises units of a non-silicone vinylic crosslinker.

17. The silicone hydrogel contact lens of claim 14, wherein the non-silicone vinylic crosslinker is selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, vinyl methacrylate, allylmethacrylate, allylacrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane tri methacrylate, pentaerythritol tetramethacrylate, bisphenol A dimethacrylate, or a reaction product of a diamine with an epoxy-containing vinylic monomer, and combinations, wherein the diamine is selected from the group consisting of N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof, and wherein the epoxy-containing vinylic monomer is selected from the group consisting of glycidyl (meth)acrylate, vinyl glycidyl ether, allyl glycidyl ether, and combinations thereof.

18. The silicone hydrogel contact lens of claim 16, wherein the crosslinked polymeric material comprises units of a UV-absorbing vinylic monomer.

19. The silicone hydrogel contact lens of claim 18, wherein the UV-absorbing vinylic monomer is selected from the group consisting of 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate, 2-hydroxy-5-methoxy-3-(5-methoxy-2H-benzo[d][1,2,3]triazol-2-yl)benzyl methacrylate, 3-(5-fluoro-2H-benzo[d][1,2,3]triazol-2-yl)-2-hydroxy-5-methoxybenzyl methacrylate, 3-(2H-benzo[d][1,2,3]triazol-2-yl)-2-hydroxy-5-methoxybenzyl methacrylate, 3-(5-chloro-2H-benzo[d][1,2,3]triazol-2-yl)-2-hydroxy-5-methoxybenzyl methacrylate, 2-hydroxy-5-methoxy-3-(5-methyl-2H-benzo[d][1,2,3]triazol-2-yl) benzyl methacrylate, 2-hydroxy-5-methyl-3-(5-(trifluoromethyl)-2H-benzo[d][1,2,3]triazol-2-yl)benzyl methacrylate, 4-allyl-2-(5-chloro-2H-benzo[d][1,2,3]triazol-2-yl)-6-methoxyphenol, 2-{2'-Hydroxy-3'-tert-5-[3''-(4''-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-, 2-(2'-hydroxy-5'-methacryloxyethylphenyl) benzotriazole (2-Propenoic acid, 2-methyl-, 2-[3-(2H-benzotriazol-2-yl)-4-hydroxyphenyl] ethyl ester, 2-{2'-Hydroxy-3'-tert-butyl-5'-[3'-methacryloyloxypropoxy]phenyl}-5-methoxy-2H-benzotriazole, 2-[2'-Hydroxy-3'-tert-butyl-5'-(3'-acryloyloxypropoxy)phenyl]-5-trifluoromethyl-2H-benzotriazole, 2-(2'-hydroxy-5-methacrylamidophenyl)-5-methoxybenzotriazole, 2-(3-allyl-2-hydroxy-5-methylphenyl)-2H-benzotriazole, 2-(2-Hydroxy-3-methallyl-5-methylphenyl)-2H-benzotriazole, 2-3'-t-butyl-2'-hydroxy-5'-(3''-dimethylvinylsilylpropoxy)-2'-hydroxy-phenyl)-5-methoxybenzotriazole, 2-(2'-hydroxy-5'-methacryloylpropyl-3'-tert-butyl-phenyl)-5-methoxy-2H-benzotriazole, 2-(2'-hydroxy-5'-acryloylpropyl-3'-tert-butyl-phenyl)-5-methoxy-2H-benzotriazole, 2-Methylacrylic acid 3-[3-tert-butyl-5-(5-chlorobenzotriazol-2-yl)-4-hydroxyphenyl]-propyl ester, 2-(3-(tert-butyl)-4-hydroxy-5-(5-methoxy-2H-benzo[d][1,2,3]triazol-2-yl)phenoxy)ethyl methacrylate; Phenol, 2-(5-chloro-2H-benzotriazol-2-yl)-6-methoxy-4-(2-propen-1-yl); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer, and combinations thereof.

* * * * *